United States Patent

Abramson et al.

[15] 3,697,959

[45] Oct. 10, 1972

[54] DATA PROCESSING SYSTEM EMPLOYING DISTRIBUTED-CONTROL MULTIPLEXING

[72] Inventors: Carl N. Abramson, Somerville; Mark T. Nadir, Warren, both of N.J.

[73] Assignee: Adaptive Technology, Inc., Piscataway, N.J.

[22] Filed: Dec. 31, 1970

[21] Appl. No.: 103,191

[52] U.S. Cl..........340/172.5, 179/15 AL, 179/15 BA
[51] Int. Cl.................................................G06f 9/18
[58] Field of Search...340/172.5; 179/15 BA, 15 AL; 178/50

[56] References Cited

UNITED STATES PATENTS

| | | | |
|---|---|---|---|
| 3,422,226 | 1/1969 | Acs | 179/15 BA |
| 3,544,976 | 12/1970 | Collins | 340/172.5 |

*Primary Examiner*—Raulfe B. Zache
*Attorney*—Kenyon & Kenyon Reilly Carr & Chapin

[57] ABSTRACT

An electrical computer system having a plurality of members including a central processing unit, peripheral devices, and user devices. Communications between the many members is carried out by a technique whereby the members operate off of a common reference, or synch, which enables the members to identify distinct periods (P) as well as discrete consecutive subperiods (SIP) located within a data portion of the periods (P). The SIP identification is accomplished by numbering and counting the SIP to determine the position where it appears in its period (P). The subperiods of SIPs are individually assigned with data meanings (words, commands, letters, numbers, symbols or data of any kind) known to the members of the system. Data is exchanged by inserting, into selected subperiods, signals (SI) identifying the sending and/or receiving members so that the receiving member may, in response to such signals, derive the data meanings simply by correlating the so-selected subperiods with their assigned data meanings. In this manner, each of the members is individually responsive to data and commands sent to them and participate as a working group with each other and with the central processing unit to perform given programs.

23 Claims, 27 Drawing Figures

INVENTORS
MARK T. NADIR
CARL N. ABRAMSON
BY
Kenyon & Kenyon Reilly Carr & Chapin
ATTORNEYS INVENTORS
MARK T. NADIR
CARL N. ABRAMSON
BY Kenyon & Kenyon Reilly Carr & Chapin
ATTORNEYS INVENTORS
MARK T. NADIR
CARL N. ABRAMSON
BY Kenyon & Kenyon Reilly Carr & Chapin
ATTORNEYS INVENTORS
MARK T. NADIR
CARL N. ABRAMSON
BY Kenyon & Kenyon Reilly Carr & Chapin
ATTORNEYS INVENTORS
MARK T. NADIR
BY CARL N. ABRAMSON
Kenyon & Kenyon Reilly Carr & Chapin
ATTORNEYS INVENTORS
MARK T. NADIR
CARL N. ABRAMSON
BY
Kenyon & Kenyon Reilly Carr & Chapin
ATTORNEYS INVENTORS
MARK T. NADIR
CARL N. ABRAMSON
BY Kenyon & Kenyon Reilly Carr & Chapin
ATTORNEYS INVENTORS
MARK T. NADIR
CARL N. ABRAMSON
Kenyon & Kenyon Reilly Carr & Chapin
ATTORNEYS INVENTOR.
MARK T. NADIR
CARL N. ABRAMSON
BY
Kenyon & Kenyon Reilly Carr & Chapin
ATTORNEY INVENTORS
MARK T. NADIR
CARL N. ABRAMSON
BY Kenyon & Kenyon Reilly Carr & Chapin
ATTORNEYS INVENTORS
MARK T. NADIR
CARL N. ABRAMSON
BY Kenyon & Kenyon Reilly Carr & Chapin
ATTORNEYS INVENTORS
MARK T. NADIR
CARL N. ABRAMSON
BY
Kenyon & Kenyon Reilly Carr & Chapin
ATTORNEYS

0 + 0 = 0
1 + 1 = 0
1 + 0 = 1
0 + 1 = 1

INVENTORS
MARK T. NADIR
CARL N. ABRAMSON
BY Kenyon & Kenyon Reilly Carr & Chapin
ATTORNEYS INVENTORS
MARK T. NADIR
CARL N. ABRAMSON
BY Kenyon & Kenyon Reilly Carr & Chapin
ATTORNEYS INVENTORS
MARK T. NADIR
CARL N. ABRAMSON
BY Kenyon & Kenyon Reilly Carr & Chapin
ATTORNEYS

DATA PROCESSING SYSTEM EMPLOYING DISTRIBUTED-CONTROL MULTIPLEXING

BACKGROUND OF THE INVENTION

The art of processing data as heretofore accomplished by instrumentalities which have come to be known by the general, somewhat vague, term "computers," involves the storing of information in digital or other form in a variety of storage devices (cores, registers, etc.) and a "program" for directing the transfer of the data in various paths between the various storage devices and various computing devices (adders, multipliers, etc.) in a central processing unit CPU to solve various problems. This necessarily involves a vast complex of switching paths set up at appropriate times by the program to shift data from one such storage or computing device to another (as from the main data bank or core to a particular register and then to an adder or multiplier). The "program" is thus the directing intelligence which directs the component pieces of information of a problem from the various storage devices to the various computing devices, and then directs the various computing devices to perform their function of adding or multiplying, and lastly directs the sum or multiplied result to some peripheral device or user devices which can include readout devices for displaying the final answer. In this sense, the storage and computing devices are passive in that they perform only when instructed to do so by the "program" and do not initiate action on their own.

As a consequence of the foregoing development of the art, the present day "computer" has many undesirable attributes and limitations. In the conventional computer, essentially all information flowing through the computer is handled by the control portion of the CPU. All working storage is controlled by the CPU. All communication paths within the machine are handled by the CPU. All interrupting functions and all co-ordination of auxiliary control units are handled by the CPU. All execute and fetch functions are handled by the CPU. Also, in "on line" or "direct access" processing, the CPU is required to communicate with several devices at once, as the transactions are fed directly to the computer, while at the same time performing computations or data handling functions. A further requirement of the CPU is that it be able to handle changes in the system configuration without extensive redesign of the constituent circuitry.

The above characteristics put stringent requirements on the CPU design: in fact, the design of the entire computer system. Batch and time sharing systems have grown out of this technology. Process control systems have grown out of time sharing systems. As a result, a myriad of functions must be performed by the CPU and in such a way as to govern virtually every step in the execution of computer programming.

SUMMARY OF THE INVENTION

It is an object of the present invention to provide a data processing system having high reliability and flexibility.

It is another object to provide a data processing system wherein the users can directly access the various parts of the system without necessarily having to go through a "central processing unit."

It is another object to provide a data processing system which accommodates a very large number of member devices without burdening the system, and without requiring alteration of soft ware or extensive re-design of the system.

It is another object to provide a data processing system which is inherently a non-message switched system in which interactive behavior of the member devices occurs at any level of machine complexity and activity, thereby reducing the loading and system tie-ups otherwise present in the conventional computers.

It is another object to provide a data processing system wherein the various peripheral devices can operate simultaneously and autonomously.

It is another object to provide a data processing system wherein each member device operates time-independently and is not "switched" into the system for message duration periods.

In application Ser. No. 861,947, now U.S. Pat. No. 3,646,274 Sept. 29, 1969 by Mark Nadir and Carl N. Abramson entitled SYSTEMS FOR INFORMATION EXCHANGE, there is disclosed and claimed a new technique for information exchange. This technique is put to unique use in the present invention as is explained hereinafter.

The technique, as will be better understood in connection with the description of FIG. 1 of the drawings, is the use of consecutive subperiods located within a portion of periods, the subperiods being synchronously related at stations of the system and individually being assigned data meanings known to the stations. Data is exchanged between the stations by sending during selected such subperiods signals identifying a sending or receiving station so that a receiving station may, in response to such signals, derive data meanings by correlating the so-selected subperiods with their assigned data meanings. Thus, the signals identify not only the assigned data meanings by occurring in the proper time subperiod, but also the sending and/or receiving stations.

The present invention employs this technique to exchange data among its members consisting of any number of central processing units CPU, peripheral devices and user devices. As will be seen later, in the preferred embodiment of the invention, a number of central processing units, peripheral devices, and user devices are positioned at various locations along a transmission or communications path using the foregoing technique. Each member, by recognizing its SI, may withdraw from this path the data necessary to the performance of its particular task whether it be adding, multiplying, etc., or reception of the result. Moreover, each such member may insert data into the path along with the SI of the member of its intended destination or origin. Moreover, user devices may communicate with peripheral stations independently of the central processing unit and the central processing unit may operate independently of the peripheral and user devices.

The fact that each member operates as an active intelligent device picking its particular task from the data path by way of detection of its own identification SI leads to very significant consequences in the way of simplification of equipment and versatility and flexibility of the data processing system by comparison with prior art techniques. As a result of the above, the members can respond to commands, receive and transmit data, and receive and transmit commands. Also the members are adapted to store multiple data and instructional commands in pairs or groups, and to arrange them in order.

It is to be understood that, as used herein, the term "-member" includes at least all or a part of the following components of the data processing system; central processing units, peripheral devices and user devices. The term "member" and "station" are to be used synonymously herein.

It is also to be understood that, as used herein, the term "period (P)" is intended to mean some known number of clock counts.

It is also to be understood that, as used herein, the term "clock counts" is intended to mean events which can be time independent, such as clock pulses or signals. In this connection, it is noted that the system of this invention need not operate off a standard coherent clock or oscillator producing uniformly time-spaced clock signals, but also could operate off of a noise source which produces clock signals or pulses at random time intervals.

It is also to be understood that, as used herein, the term "synch" circuits is intended to include the counting circuits which allow all functional units of the system to operate from the same reference point. It includes the clock for producing the clock counts. Also, the term "synchronously related" as used herein does not mean that there is necessarily an exact simultaneity of events at the members since delays in the system will cause delays as between those events. It does, however, mean that there will be simultaneity at any station in the system as between SI and the SIP in which the SI must occur.

It is also to be understood that, as used herein, the term "data interval portion" of the period (P) is intended to mean that portion comprising a plurality of consecutive subperiods which are individually assigned with data and/or command message meanings, for example, alphabetic and numeric characters, words, commands, symbols or data of any kind. The data interval portion of the period (P) is also used for HAND SHAKING purposes, the details of this operation being more fully disclosed below.

It is also to be understood that, as used herein, the term "START OF PERIOD IDENTIFIER" or "SOPI" of the period (P) is intended to mean that portion for communicating system behavior and control information, such as synch signals, instructions, HAND SHAKING data and control information.

It is also to be understood that, as used herein, the term "user" is intended to mean a human operated input/output device or anything which makes requests, gives directives and receives services from the data processing system, as opposed to the specific computer equipment providing such services. An example of a "user" is a human operated communications terminal.

DESCRIPTION OF THE PREFERRED EMBODIMENTS

Figures 1, 2, 3, 4:
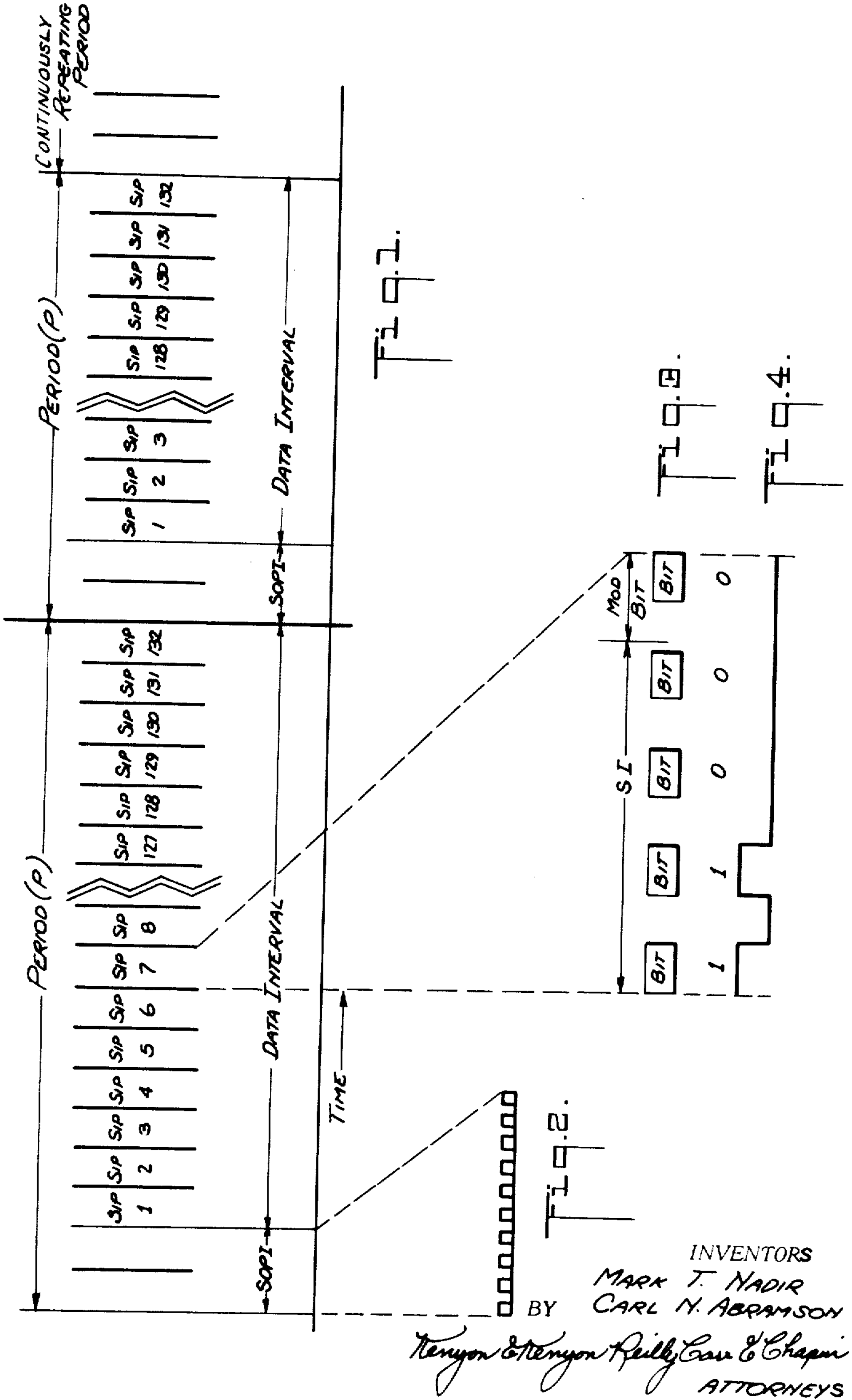
FIGS. 1 to 4 show time and signal relationships essential to an understanding of the concepts of the invention and apparatus for implementing it.

FIG. 1 illustrates two of a plurality of periods (P) in a clock pulse or bit train T. All periods (P) are continuously repetitive and synchronously related at all stations of the system. All periods (P) are subdivided into 132 data subperiods termed SIP, a term derived from "-Station Identifier Period" for reasons which will be clear later. For reasons to be explained later, the periods (P) will also include a portion designated; "-Start of Period Identifier" SOPI which, together with the "DATA INTERVAL" portion, make up the period (P). Also, means are provided for counting the SIP so that they are synchronously related at all stations.

During the SOPI, a signal will be sent to all stations of the system to identify the start of each period (P) for purpose of synchronizing equipment which must recognize all periods (P). Such a signal is shown in FIG. 2 and may comprise any convenient synchronizing signal such as the series of pulses shown.

After the SOPI there follows the DATA INTERVAL comprising a series of data subperiods SIP numbered for counting and designated $SIP_1$, $SIP_2$, $SIP_3$, $SIP_4$- - - - $SIP_{132}$ and which are individually assigned at the stations with data meanings, for example, the decimal numerals corresponding to the SIP count, as indicated. The numerical characters for data meanings are illustrated here for simplicity of explanation only, since it is to be understood that many forms of data meanings will ordinarily be needed, for example, any kind of characters or data needed in engineering or business accounting.

The data interval is used to transmit data between stations of the system by transmitting during selected ones of the subperiods $SIP_1$ to $SIP_{128}$ signals called SI (for "Station Identifier") which perform the dual function of identifying either the data sending station or the data receiving station, or both, as required, and at the same time pointing out to the data receiving station the selected data SIP (among $SIP_1$ to $SIP_{128}$) of data to be processed so that the data receiving station may interpret the assigned meaning of the selected data SIP to learn the data to be processed (1, 2, 3, etc.) as intended to be conveyed to the data receiving station by the data sending station. The SIPs 129 through 132 are used for control and HAND SHAKING purposes. For purposes of present discussion, every station of the system may be considered as having its own distinctive SI. For example, a SI transmitted during $SIP_1$ from a sending station conveys the message that the numeral "1" was intended to be signaled to the receiving station; and it also conveys the information that the "1" was intended by the sending station to be conveyed to a receiving station identified by the particular SI transmitted.

FIGS. 3 and 4 illustrate a SI signal transmitted during a SIP. As will be seen from FIG. 3, such a signal may be in binary words comprising various combinations of bits, meaning binary "ones" and "zeros." Thus, as illustrated in FIG. 4, the bits of FIG. 3 might result in the binary signal 1100 identifying either a sending or receiving station.

Since, as will be clear later, it will be necessary to count the SIP subperiods, the SOPI is arbitrarily selected to be equal in duration to one or more SIP subperiods, or a given number of bits.

While thus far there has been some emphasis on discrete time intervals for the SIP, it may be more helpful to the understanding of what is to follow, to think of the SIP more as discrete subperiods having the various assigned data meanings, the SI being signaled synchronously with the subperiods. The times of occurrence of the SIP subperiods will be important in all such processing since those times must match the times of occurrence of the SI signals.

Z-NUMBERS

It will be understood that in a system operating in accordance with the principles of FIG. 1, numerous sending stations will be "competing" to place SI in the time subperiods $SIP_1$ to $SIP_{128}$. In other words, the situation is that all sending stations seeking to place SI in a particular text SIP, as for example $SIP_8$ for numeral "8," must await their opportunity to put their SI into a particular data SIP and if that particular data SIP is already in use, they cannot use it and must try that data SIP again on the next or succeeding periods (P).

It is known that in ordinary arithmetical operations some numerals are used with far greater frequency than others. This necessarily means that in a system in accordance with the principles of FIG. 1, the corresponding subperiods $SIP_1$ to $SIP_{128}$ will be used more or less frequently depending on their numerical data meaning. It also necessarily means that some SIP will be in excessive demand compared to others, and that consequently while some stations attempting to convey a given frequently used numeral must await until later periods (P) because of excessive demand for the corresponding SIP, the SIP for an infrequently used numeral is passing unused. If a more even distribution of the demands on all data SIP could be worked out in this situation a great improvement in the use of available time would result. In other words, for example, if an excessive demand load on the time allocated to the SIP for the numeral "8," for example, could be shifted in time to the time allocated to the SIP for the numeral "5," for example, the load on the SIP for the numeral "8" would be satisfied much faster without prejudice to demands on the SIP for the numeral "5" if the SIP for the numeral "5" is relatively unused. If shifting can be carried out in such a way that all SIP are used and none unused as time proceeds through the various periods (P) and their data subperiods $SIP_1$ to $SIP_{128}$, the system will be more efficient in use of available time.

This invention, by use of the Z-number, meets the problem if not to 100 percent efficiency in use of available time, at least it approaches it (up to a calculated efficiency of about 95 percent).

Basically, the function of the Z-number is to shift the signaled SI by a fixed number of SIP at the data sending station and shift the SI back by the same number of SIP at the data receiving station so that the SIP data labelling illustrated by FIG. 1 is restored for interpretation by the data receiving station equipment. In other words, the Z-number causes the SI to be sent in the wrong SIP as far as data meaning is concerned, but on reception of Z-number restores the SI to the correct SIP, as far as data meaning is concerned. This might be said to be a shifting of the SIP time "spectrum" illustrated in FIG. 1. In the simplest Z-number operation, the Z-number is either changed in some periodic pattern as by simple arithmetic permutation, or, more preferably, changed completely at random.

The important concept behind the Z-number, particularly when it is changed completely at random and frequently, is one of completely random choice of the data $SIP_1$ to $SIP_{128}$ during which are sent so that there is a maximum probability that the SI load imposed by all stations is uniformly distributed over all data $SIP_1$ to $SIP_{128}$. If that occurs, there is a maximized probability that efficiency in use of available time is made to approach 100 percent.

Figure 5:
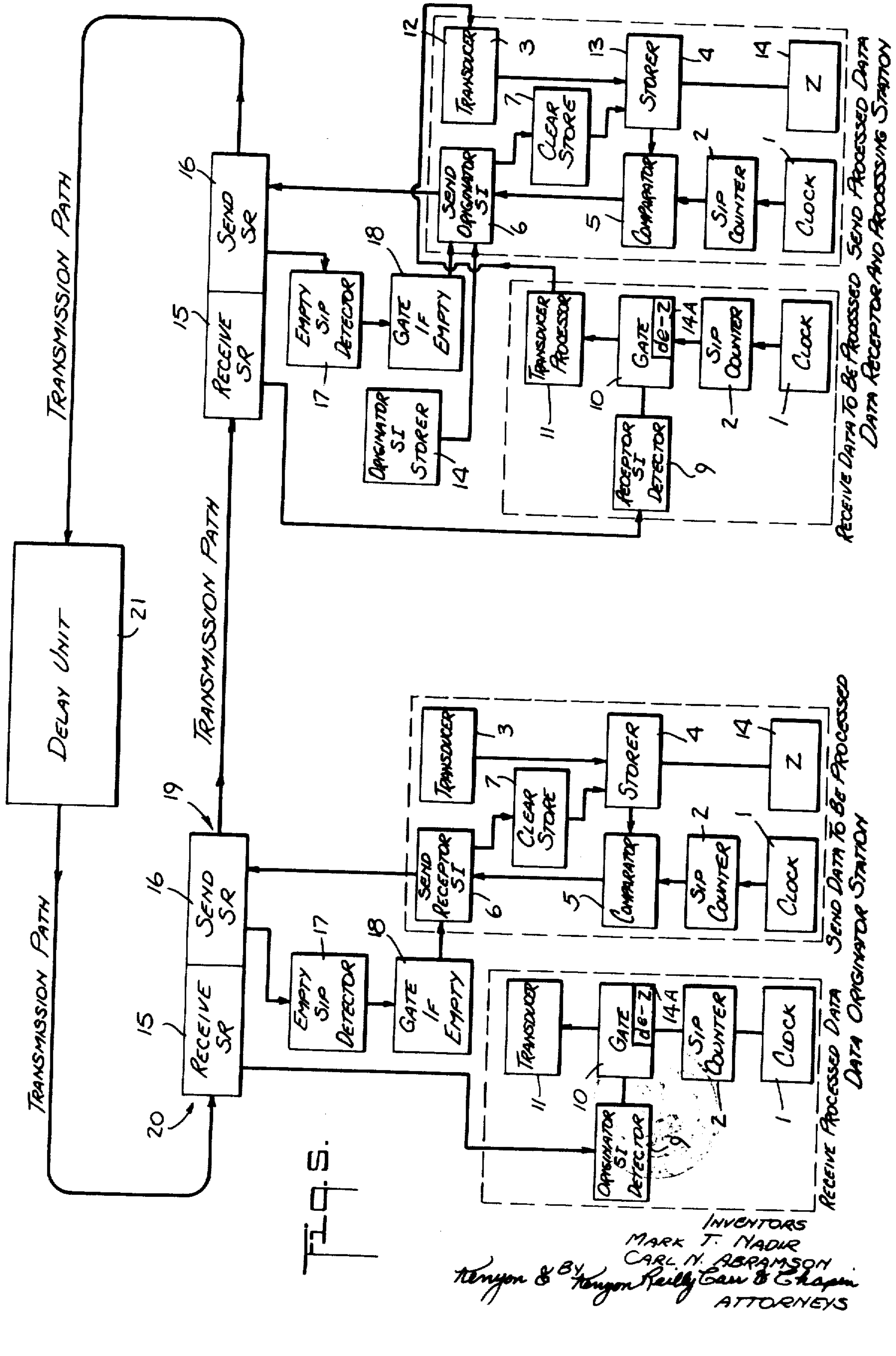
FIG. 5 shows a block circuit diagram of apparatus essential to the manner in which the invention is implemented.

FIG. 5 shows apparatus essential to an understanding of the manner in which the invention is implemented in more detailed apparatus to be explained later.

FIG. 5 illustrates a data sending or originating station and a data receiving and processing station CPU with a transmission path therebetween. The transmission path may be by wire, cable, or electromagnetic wave, as in radio or television. The transmission path is shown as a closed loop. While only one originator (sending) station and one receptor (receiving) and processing station are shown, it should be understood that more stations will ordinarily be provided along the transmission path and the additional stations will be identical with those shown.

The data originator station may, for example, be thought of as an installation which originates numbers to be added or multiplied by the data receptor and processing station. The data receptor and processing station may, for example, be thought of as an installation CPU which adds or multiplies the numbers received from the data originator station and subsequently sends the sum or product back to the data originator station.

The equipment at all stations of the system will function synchronously as previously indicated in connection with FIGS. 1 to 4. This is illustrated in FIG. 5 by the clocks 1 and SIP counters 2 all of which operate synchronously in respect to periods (P) and the counting of all SIP in each period. The clock and SIP counter functions can be performed by many means well known in the electrical arts; and such means may involve equipment common to all originator and receptor stations or more or less individual to such stations. Thus, it is clear that all members of the system can recognize all periods (P) and all time subperiods SIP at the times they occur so that they may interpret the data meanings of the data $SIP_1$ to $SIP_{128}$ when SI occur in them.

The "Send Data to be Processed" section of the data originator station will be constructed and will function as follows: Data to be transmitted from data Originator Station to the data receptor and processing station will be inserted initially into the system by means of a transducer 3 which will include some kind of mechanism for translating data into the form indicated by FIGS. 1 to 4, namely, in which all of the DATA SIP are assigned numerical meanings. For example, assume that the transducer 3 includes a teletypewriter device which, on being caused to print the numeral "8" also translates it to the binary word 00001000 (8 in decimal arithmetic) which is the count number for the text $SIP_8$ to which the data numeral "8" is assigned (FIG. 1). This binary word 00001000 will then be stored in conventional storer 4. Storer 4 is for so-called "dynamic storage" and may take many forms such as a transistorized flip-flop circuit, drums, tapes, punch cards, etc.

SIP counter 2 will also be counting the data SIP of successive periods (P) in binary form, that is 00000001 for data $SIP_1$; 00000010 for data $SIP_2$; 00000011 for data $SIP_3$; 00000100 for data $SIP_4$; 00000101 for data $SIP_5$; 00000110 for data $SIP_6$; 00000111 for data $SIP_7$; 00001000 for data $SIP_8$, and so on for higher numbers.

At this stage there is therefore stored in storer 4 the information that the data Originator Station wishes to signal data $SIP_8$ over the transmission path so that the data receptor and processing station may interpret $SIP_8$ and thereby know that the numeral "8" was intended to be conveyed. This signaling is accomplished by having the data Originator Station send the identifying SI of the data receptor and processing station over the transmission path during the time subperiod of data $SIP_8$. The data receptor and processing station will, by identifying its own SI, during $SIP_8$ be able to determine that $SIP_8$ requires its attention. The way this is accomplished at the data originator station is as follows:

SIP counter 2 at the "Send Data To Be Processed" section successively feeds the above binary counts of data $SIP_1$, $SIP_2$, $Sip_3$- - -$SIP_{128}$ into comparator 5 which is also fed by storer 4. During each successive SIP, comparator 5 compares the binary count stored in storer 4 by transducer 3 with the binary SIP count from SIP counter 2. If the two are identical (as for $SIP_8$ in the above example), the comparator 5 actuates "send SI" device 6 to send the SI of the data receptor and processing station over the transmission path. That SI will of course go over the transmission path synchronously with $SIP_8$. At the same time, "send SI" device clears the storer 4 by suitable "clear store" device 7. If the comparator 5 finds no identity of the binary counts from counter 2 and storer 4, the "send SI" device 6 is not actuated and the storer 4 is not cleared.

It will be necessary to provide means to insure that not more than one data Originator (sending) Station sends a SI or SI's at the same time, but that means will be explained later.

It should now be clear that the SI of the data receptor and processing station proceeds over the transmission path in time coincidence with the SIP to be identified to the data receptor and processing station. In the example used, the SI of the data receptor and processing station occurs during $SIP_8$ so that the data receptor and processing station may interpret it as the numeral "8."

Therefore, what the data receptor and processing station needs to do is to detect its own SI and then relate it synchronously to the synchronously occurring data SIP.

Therefore, the data receptor and processing station in FIG. 5 detects its own SI in its binary form indicated in FIGS. 3 and 4. The SI being binary in form is readily detected by any well-known means indicated as receptor SI detector 9 in the "Receive Data To Be Processed" section. Upon detection of the SI, the detector 9 puts out a signal which is applied to gate 10 which will put out a signal whenever SIP counter 2 of the "Receive Data To Be Processed" section is running through the SIP corresponding in time to that of the SI detected at detector 9. Since the latter SIP counter 2 is synchronous with SIP counter 2 of the Date Originator Station because of synchronous clocks 1, SIP counter 2 of the "Receive Data To Be Processed" section will present $SIP_8$ to gate 10 at the same time that the SI of the data receptor and processing station is sent over the transmission path. Therefore, during $SIP_8$, gate 10 will put out a signal meaning "this is the SIP to be interpreted for data meaning."

The output of gate 10 will be fed to transducer-processor 11 which will first transduce or convert the binary form of the SIP count number back to the numeral data meaning of the SIP (i.e., the numeral "8" for $SIP_8$, as above) in some convenient form so that that data meaning may be processed with other data meanings also coming over the transmission path and through gate 10 in the manner described. For example, transducer-processor 11 may include a conventional adder or multiplier which multiplies or adds two numerals received over the transmission path and through gate 10 in the foregoing manner. The sum or result put out by such adder or multiplier will then be transduced in transducer 12 to a binary number corresponding to the SIP count number to which the sum or result corresponds in data meaning in FIG. 1. The functioning of the "Send Processed Data" section is from here on essentially the same as that described for the "Send Data To Be Processed" section of the Data Originator Station. That is to say, that the sum or result now stored in storer 13 is now sent back to the Data Originator Station over the transmission path as follows.

As comparator 5 in the "Send Data To Be Processed" section of the Data Originator Station functioned to gate a "send SI" at the right time for the sending of data to be processed from the "Send Data To Be Processed" section, in the same manner, the "Send Processed Data" section of the Data Receptor and Processing Station will function to gate a "Send Originator SI" at the right time for the sending of the sum or result in the proper SIP back to the Data Originator Station. For this purpose, the originator SI is stored in Originator SI storer 14.

That is to say that, when the SIP count coming from SIP counter 2 of the Send Processed Data section matches the sum or result (in binary) in storer 13, the comparator 5 in the Send Processed Data section will actuate "Send Originator SI" 6 of the Send Processed Data section to send the data originator station SI stored in originator SI storer 14 back to the data originator station in the proper SIP.

The data originator station will detect its SI in originator SI detector 9 of the "Receive Processed Data" section of the data originator station. From there on the action of the "Receive Processed Data" section is essentially the same as that of the "Receive Data To Be Processed" section of the data receptor and processing station (with the omission of processing). That is to say that, gate 10 of the receive processed data section is gated by originator SI detector 9 to transfer the SIP count of the processed data from SIP counter 2 in the Receive Processed Data section to transducer 11 in that section. The latter transducer 11 will then convert that SIP count to the corresponding data meaning indicated by FIG. 1.

To illustrate the foregoing actions in a multiplying action, assume that an operator at the data originator station wishes to multiply numerals 2 × 8. He will first introduce "2" to transducer 3 in the Send Data To Be Processed section and the system will function to send the Receptor station SI from Send Receptor SI 6 during $SIP_2$. He will next do the same for the "8" in $SIP_8$. The multiplier in transducer-processor 11 of the Receive Data To Be Processed section will then multiply 2 × 8 and the originator SI will be sent back in $SIP_{16}$ by the send processed data section to the Receive Processed Data section where it ill be interpreted as the numeral 16 at transducer 11 of the latter section.

SHIFT REGISTERS

The SI sent over the transmission path in the foregoing manner are processed to and from the stations through Receive and Send Shift registers SR. A SI coming into a station is stored in a receive shift register 15 and a SI going out from a station is stored in a send shift register 16. Whenever either the originator or receptor station wishes to signal a SI over the line in some particular SIP, it will be necessary first to determine whether that particular SIP is already "occupied" by another SI in the transmission path, that is, whether there is already a SI in either of send shift registers 16 at the time either the originator or receptor station wishes to insert a SI into one of them. This determination is made by empty SIP detectors 17 which detect the absence or presence of a stored SI in their respective send shift registers 16. Detectors 17 control gates 18 in turn control send SI devices 6. Thus, if detectors 17 indicate a SI stored in send shift registers 16, send SI devices 6 are prevented from sending SI, but if detectors 17 indicate no such SI storage in send shift registers 16, then send SI devices 6 are permitted to send SI for storage in send shift registers 16.

Z-NUMBER OPERATION

The Z-number operation is illustrated in FIG. 5 by the Z-number generator 14 in the Send Data To Be Processed section of the data Originator Station and de-Z device 14A in Receive Data To Be Processed section of the Data Receptor and Processing Station. Z-number generator 14 adds some arbitrary binary number to storer 4 so that the binary number stored therein is changed to that corresponding to some other data SIP. For example, if the binary Z-number 00010000 (16 in decimal) is added to the binary number 00001000 for the count of $SIP_8$ (data numeral 8) in the storer 4 of the above example, the result will be 00011000 (24 in decimal) corresponding to $SIP_{24}$ which corresponds to the data numeral "24." Consequently, the data numeral "8" stored in storer 4 as binary 00001000 will, in effect, be transmitted as though it were the data numeral "24".

But at the receptor station, the process will be reversed to restore the data numeral "8." That is to say that at the receptor station, the binary Z-number 00010000 is subtracted in de-Z device 14A to restore the binary number 00001000 (data numeral "8"). subtraction may be accomplished by well-known "bit-by-bit" adding.

The same Z-de-Z operation occurs as between Z-number generator 14 in the Send Processed Data section and the De-Z device 15 of the Receive Processed Data section.

CLOSED LOOP TRANSMISSION PATH

The purpose in having a closed-loop transmission path is to permit a SI to pass and return to the originator station in the proper SIP. At such time, that particular station will remove that SI from its SIP and thus "erase" the SI from the transmission path leaving its SIP empty for reuse.

To understand how the transmission path loop is designed in order to realize the purpose of the last paragraph, consideration must be given to the fact that a finite amount of time is required for a SI and clock pulses which identify the SIP to progress around the transmission path loop and that there will be delays in the shift registers 15 and 16 and any associated equipment. Such delays will normally result in a mismatch between SIP initiated at the originator station and those returning around the loop. The closed system is shown in FIG. 5.

The objective of the design for the transmission path to realize the foregoing purpose is best understood by assuming that clock train pulses and periods (P) initiate at some arbitrary point in the transmission path, such as the output 19 of the originator station and progress around the loop to return to input 20. Upon return, however, they must match in time the initial clock pulses and periods (P), pulse, period (P) for period (P), and SIP for SIP so that any SI progressing around the transmission path will match in time the initial clock pulses, periods (P) and SIP. In other words, there must be no non-matching overlap or displacement in time between initial clock pulses, periods (P) and SIP at output 19 and the returning clock pulses, periods (P) and SIP.

It is the function of the delay unit 21 to match the timing of the clock pulses and returning SI so that the returning SI arrive in proper time relationsuip. This action of the delay 21 may be called "justifying" the clock pulses and/or periods, and/or SIP.

THE FIGURES 6 THROUGH 9

Figure 6:
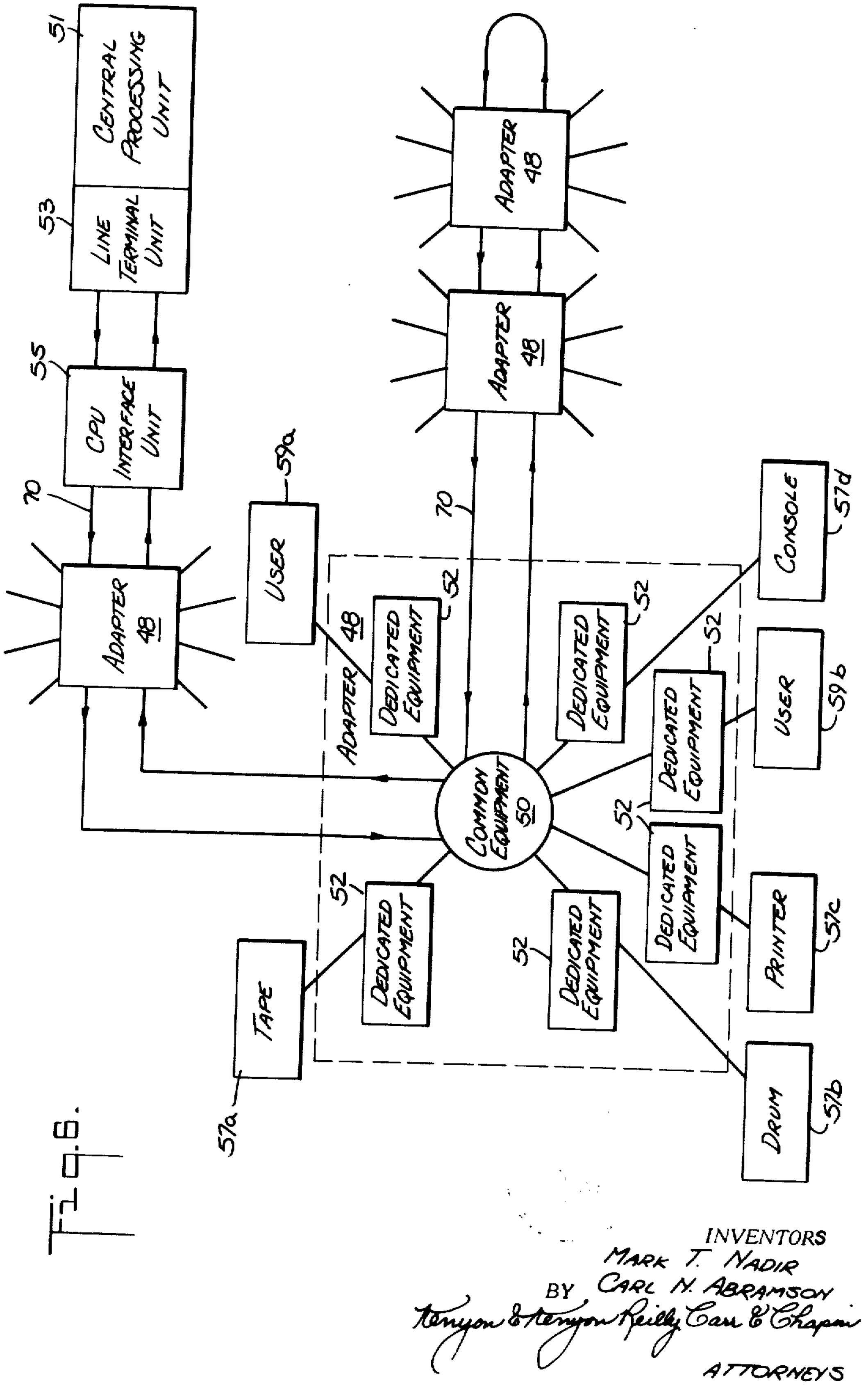
FIG. 6 shows a general block diagram of a computer system illustrative of the invention, including a central processing unit, a plurality of peripheral devices and users, and adapters connecting the parts of the computer system.

Referring to FIG. 6, there is shown a general block diagram of a computer system according to the principles of this invention. The system comprises a plurality of computer peripheral devices arranged generally in series with each other as well as with a central processing unit CPU 51. The central processing unit 51 is equipped with a line terminal unit 53 connecting with a CPU interface unit 55 which provides an interface between such central processing unit 51 and the peripheral devices. The peripheral devices, indicated by numerals 57*a*, *b* *c* and *d*, include such standard items as tape decks, memory cores, drums, printers and consoles. Also connected in series with the peripheral devices and the central processing unit 51 are the user devices 59*a* and *b* associated with the computer system. As shown by the dotted line enclosure in FIG. 6, each of the peripheral device 57 and the user devices 59 are connected to the line 70 by adapters 48, each adapter 48 comprising common equipment 50 and dedicated equipment 52. Details of the circuitry comprising the common equipment 50 and the dedicated equipment 52 are provided in a later portion of the description. Of course, it is to be understood that any number of adapters 48 and dedicated equipment 52, other than that number shown in FIG. 6, can be connected together to meet the requirements of a given system.

The central processing unit 51 stores the program information as well as storing data from, for example, the drum 57*b* which is placed into the memory core in the central processing unit 51. Unit 51 processes the program by means of its internal machinery and the peripheral devices 57. The data for the program is constantly delivered from the drum 57*b* and placed into the memory core, thereby enabling the computer to work mostly out of the memory core, Data is also drawn from other peripheral devices, such as printers, tapes, and card readers, and placed into the memory core. In this fashion, the central processing unit 51 constantly communicates with its peripheral devices.

Figure 7:
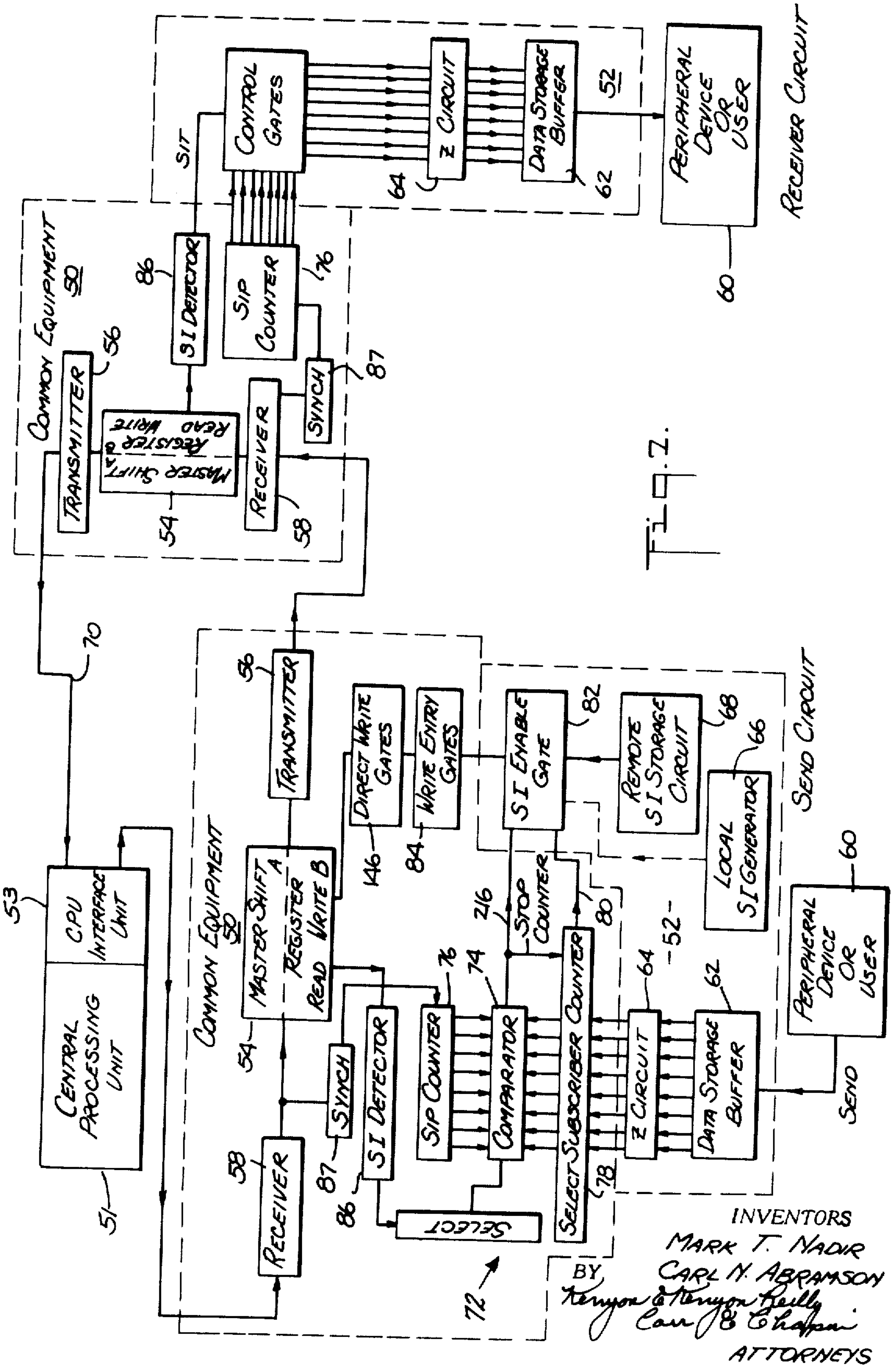
FIG. 7 shows a block diagram of a computer system connected to a closed loop or linear network according to another embodiment of the invention, with the circuit flow paths in the common and the dedicated equipment drawn for either peripheral devices or users in the send and receive modes of operation, respectively.

As shown by FIGS. 6 and 7, each peripheral device 57*a–d* and user device 59*a*, *b* has access to each other as well as to the central processing unit 51, by means of the adapters 48. Referring specifically to FIG. 7, the peripheral devices and the users are generally indicated by numeral 60. It is again noted that the members or stations of this system comprise the central processing unit, the peripheral devices and the user devices.

Generally, the dedicated equipment 52 comprises a data storage buffer 62 for storing the binary characters, and a Z-circuit 64 for transforming a given binary character into a different binary character and for restoring it to the original character, by operating with a predetermined binary number on each character. Each dedicated equipment 52 also comprises a local address identifier, hereinafter called local SI generator 66, which puts out the identifying binary signal of the particular peripheral device or user associated with a given dedicated equipment 52, and a remote SI storage unit 68 used to store the SI of other peripheral devices, users and/or the central processing unit 51. It is pointed out that each user, peripheral device and central processing unit will have its own designated SI, as well as a randomly selected Z-number which will be communicated to one another prior to their interchange of text data. Also, each dedicated equipment 52 will operate from a common reference base or synch which is derived by counting circuits located in the common equipment 50, which circuits make it possible for each part of the computer system to operate from the same reference point.

The common equipment 50 generally comprises a master shift register 54 for receiving data in the form of binary labeled SI, and modification bit (mod bit) signals which act to modify the content of information, from any one of its associated peripheral devices and user devices engaged in the send mode and placing it on the transmission line 70, or for receiving the SI's coming off of the transmission line 70 and designated for receipt by one of the peripheral devices and user devices of such master shift register 54. Thus, any one of the peripheral devices and user devices can read information, which is designated for the same, out of the master shift register 54 or, alternatively, any one of these peripheral devices and user devices may write information into the master shift register 54 for transmission. The master shift register 54 is connected on each side, respectively, to a ternary to duo-binary received (demodulator) 58 and a duo-binary to ternary transmission (modulator) 56. As noted previously, since the system transmits information on the line 70 in ternary form consisting of a first sine wave, equivalent to plus one, a second sine wave, inverted with respect to such first sine wave and equivalent to minus one, and a zero level signal equivalent to a zero, then the ternary data must be transformed into or out of binary form. Accordingly, the receiver 58 and transmitter 56 of the common equipment 50 perform these functions so that the information may be written into or read out of the master shift register 54 in binary form. For convenience, a duo-binary system is operated in conjunction with the ternary line data.

As mentioned above, at certain times the SI of a particular peripheral device will be entered into the master shift register 54. However, the particular count at which this entry occurs is critical to the transmission of data since the information content or character text is determined by the particular text SIP into which the SI appears. For instance, if the 15th text SIP has been designated to represent the letter "O" as between a particular peripheral device and the control processing unit 51, then the appearance of the receiver's SI in the 15th SIP will indicate to the receiver that the character "O" is being transmitted. With such point in mind it is obvious that the writing of a SI into the master shift register 54 can be made only at the particular SIP count in the period representing the particular data character to be transmitted. To accomplish the entry or writing function into the master shift register 54, a select mechanism 72 is employed to select the particular one of the associated peripheral devices and users to enter data into the register 54 at each available SIP count. Select mechanism 72 includes a comparator circuit 74, a SIP count circuit 76, and a select subscriber counter 78.

The comparator circuit 74 compares the binary data submitted by the Z-circuits 64, of any of the peripheral devices and users wishing to send such data, with the binary characters represented by each SIP that appears in the SIP count circuit 76. When a match occurs, the comparator 74 generates a signal on line 216 which stops the select subscriber counter 78 in the select circuit 72. Select subscriber counter 78 provides an indication as to which of the peripheral devices and users has this matched character which is ready for entry into the master shift register 54. After the select subscriber counter 78 is stopped it provides a signal on line 80 to a SI enable gate 82 located in that dedicated equipment 52 which has presented the matched character. SI enable gate 82 also receives the comparator match signal on line 216. Actuation of the SI enable gate 82 opens the entry gates 84 and direct write gates 146 to the master shift register 54 for only that selected subscriber whereby the SI stored in the remote SI storage unit 68 of the selected peripheral device in the remote SI storage unit 68 of the selected peripheral device or user passes through entry gates 84 after which it will be entered into the register 54 in the appropriate character SIP. Each SI that is entered into the master shift register 54 will be read out at another point of the transmission line 70 by the receiver device or user having been assigned that SI and having substantially identical dedicated equipment 52 as the sending device or user. At the receiver's end, a SI detector 86 in the common equipment 50 associated with the receiver will decode the SI, and together with counting and detection circuits including a synch circuit 87 and the SIP counter 76 which track the incoming information to determine its appropriate SIP position in the period, directs the data to the identified device or user. With this done, the transmitted character may be known. It is to be noted that the central processing unit 51 sends and receives data to the peripheral devices and users in a manner similar to that outlined above.

As mentioned previously, the data information at the sender's end was transformed by a Z-circuit 64 prior to its entry as a SI into a tagged SIP period. Accordingly, in order that the original character be known by the receiver, the information arriving at the receiver's circuits must be de-Zed. This is accomplished by the receptor's Z-circuit 64 which operates with the original Z-number, previously stored, on the Z-ed binary character. Subsequently, the original binary character is restored and inserted into the storage buffer 62 for use by the peripheral device or user receiving the data.

CPU INTERFACE UNIT

Figure 8A:
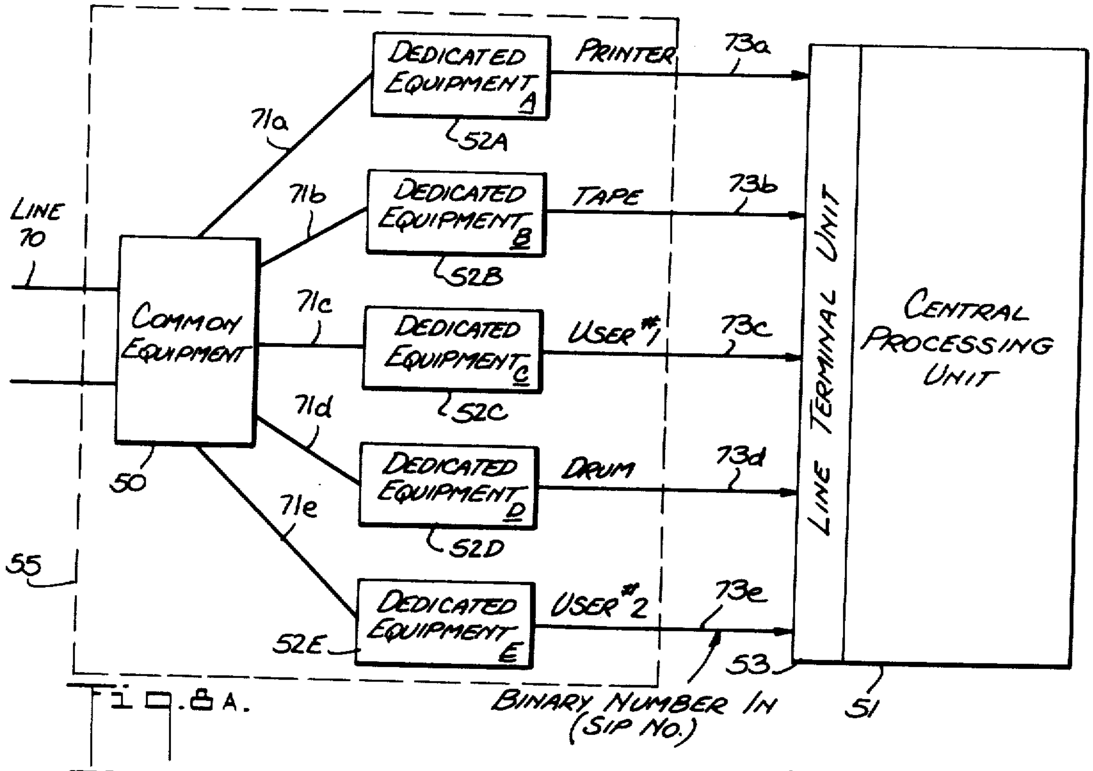
FIGS. 8A, B and C respectively show three embodiments of the interface unit connecting the central processing unit to the lines leading to the peripheral devices and the users.

As noted above, there is connected to the line terminal unit 53 of the central processing unit 51 a central processing unit (CPU) interface unit 55. As shown in FIGS. 8A, B and C, the CPU interface unit 55 can be designed in a number of different ways, depending upon the nature of the signals presented to the central processing unit 51. Specifically, referring to FIG. 12A, the CPU interface unit 55 is simply an adapter 48 comprising the common equipment 50 and dedicated equipment 52 shown in FIG. 7. The line information enters the common equipment 50 from the transmission line 70 where it is demodulated into binary signals. These signals represent station identifier SI signals defining the addresses of the various parts of the computer system. In addition, these signals carry implicit information by means of the particular SIP count in the period (P) in which the SI was inserted. The common equipment 50 detects the SI received on the line 70 and, depending on the particular SI detected, sends a signal on respective ones of lines **71*a–e* leading into dedicated equipment 52A–E. When an identification signal is received by a dedicated equipment, such as 52C, such dedicated equipment produces on its output line 73*c* a binary number corresponding to or identical with the SIP number of the SIP count in which such identification signal was received. As a result, the line terminal unit receives only signals representing binary numbers on lines 73*a–e*, and the particular ones of such lines 73*a–e* indicates the source of such signals. For instance, if the line terminal unit 53 receives signals on line 73*d***, then it automatically knows that such data is arriving from a particular drum.

Figure 8B:
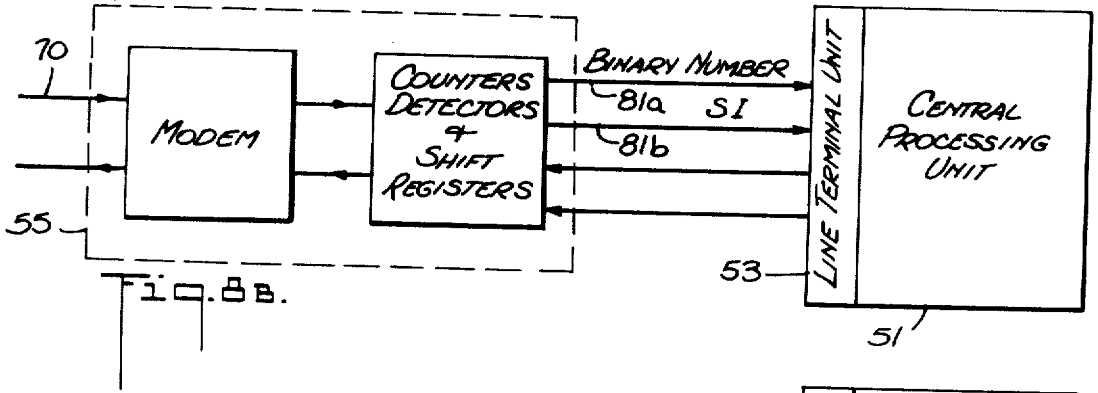

Referring to FIG. 8B, there is shown another form of CPU interface unit 55. Here, unit 55 essentially comprises only a portion of the common equipment 50 shown in FIG. 8A but does not include the dedicated equipment 52 shown in FIG. 8A. Specifically, the CPU interface unit 55 includes a modem and counter. The signals entering the unit 55 from line 70 are demodulated in the modem and converted from sinusoidal signals into binary signals. Such binary signals represent the address SI received from the line in each SIP. The counters in the interface unit 55 provide a SIP count representing each of the subperiod positions in the period (P) in which each SI is inserted. Consequently, binary numbers corresponding to the SIP counts in which each SI is inserted will be provided on the line 81*a*. Also, signals representing the received SI are carried on line 81*b*. Thus, at any given time, there will appear on the respective lines 81*a* and *b*, both the binary number and the SI which are received by the line terminal unit 53 of the central processing unit 51.

While the CPU interface unit 55 shown in FIG. 8A provides the central processing unit 51 with signals representing binary numbers which correspond to SIP numbers, the unit 55 shown in FIG. 8B additionally provides the central processing unit 51 with address signals SI. It is noted, however, that the FIG. 8A embodiment indirectly indicates the addresses SI by the particular one of lines 73*a–e* on which the binary number signals are placed.

Figure 8C:
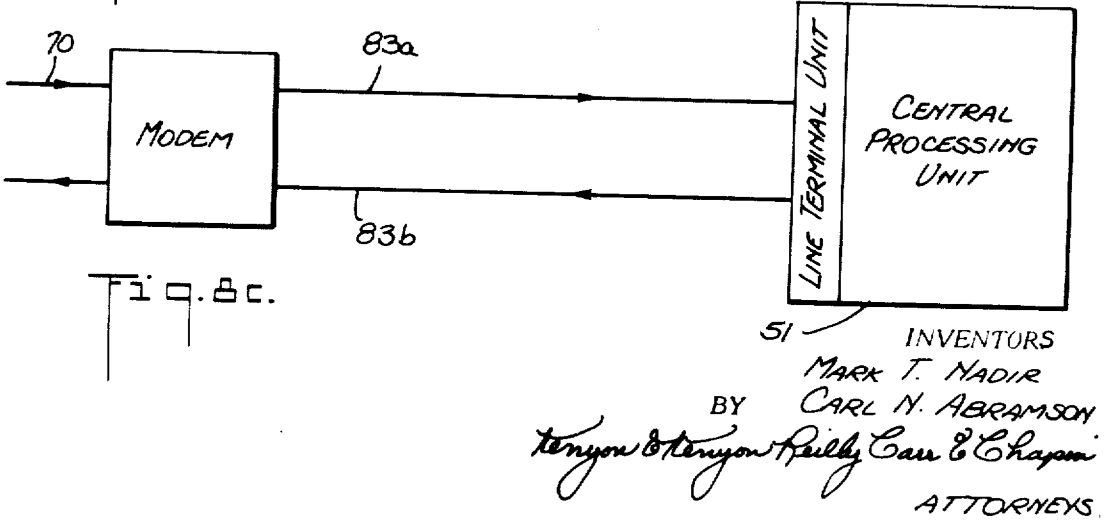

Referring to FIG. 8C, there is shown still another form of the CPU interface unit 55. By contrast, this is the simplest embodiment in that the unit 55 comprises only a modem for modulating and demodulating the signals sent out on or received from the transmission line 70. In this case, the signals received on line 70 are demodulated in the modem and from there carried on line 83*a* to the central processing unit. The signals on line 83*a* are binary signals representing the addresses SI of the various parts (peripheral devices and users) of the computer system. The text or intelligence is determined by the particular SIP position in which the SI are inserted. This can be determined by counting and timing devices in the central processing unit 51. In the same manner, binary data leaving the central processing unit 51 on line 83*b* is similarly in the form of address information.

Figure 9:
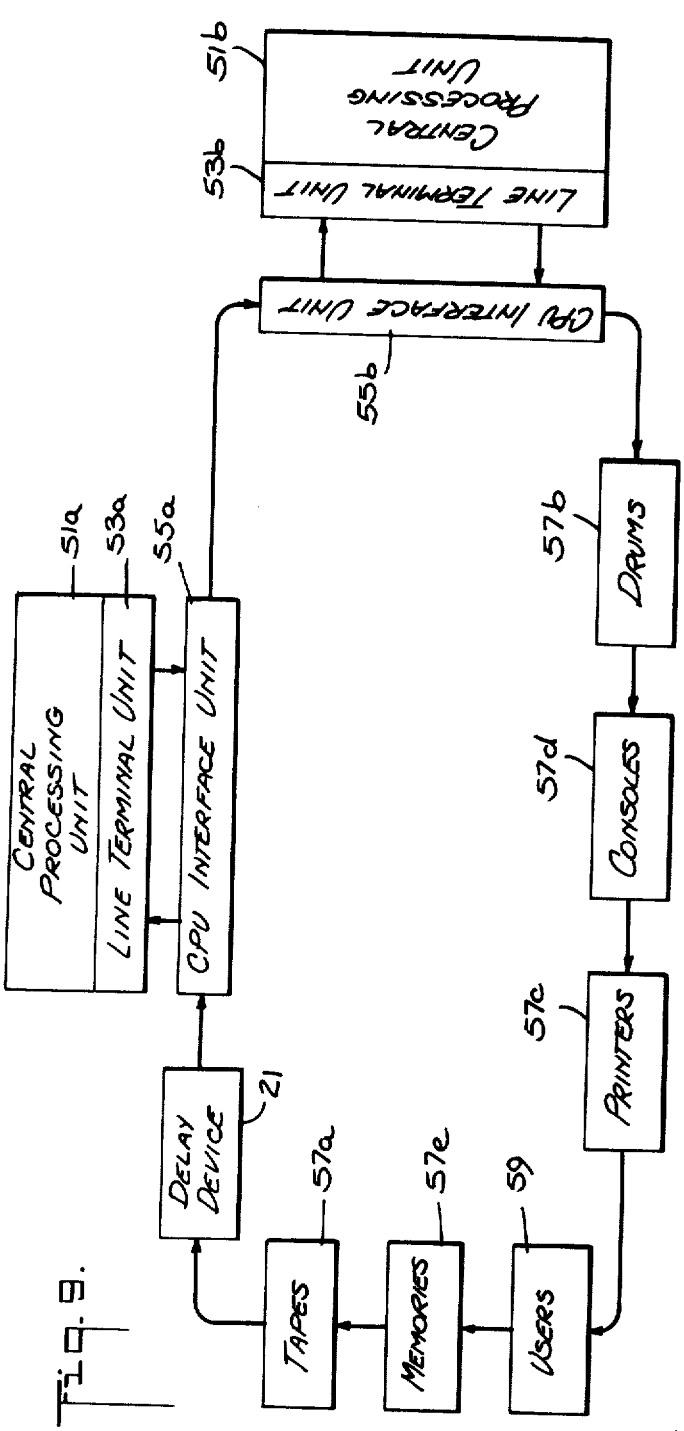
FIG. 9 shows a general block diagram of a computer system similar to that shown in FIG. 6, except that it employs two central processing units and is arranged in a closed loop arrangement similar to that shown and described with reference to FIG. 5.

Referring to FIG. 9, there is shown a circuit block diagram of a closed loop computing system similar in operation to that system shown in FIG. 5. Here, two central processing units 51A and 51B are connected to a common data line along with a plurality of peripheral devices and user devices. As in the data processing system shown in FIG. 6, all of the members (central processing units, peripheral devices and user devices) are responsive to data and commands sent to them and participate as a working group with the central processing units 51A and 51B to perform given programs. The central processing units 51A and 51B operate on different programs depending on their availability to take on such programs at given times and depending, in some instances, on the nature of the programs.

The data processing system shown and described with reference to the FIGS. 1 through 9 employs modification bits sent together with the identifying signals SI in the SIP's. The modification bits serve to modify or change the meanings assigned to the individual SIP's. For instance, the modification bits can be used to represent that a particular SIP is a command SIP, a data SIP, a location bearing SIP, a special meaning SIP, or a magnitude SIP. The modification bits can also represent that a SIP is a certain one of a string of SIP's.

Thus, the data and instructional commands are conveyed by employing distinct text subperiods in which an identifying signal SI and modification bit is inserted. The member devices are adapted to detect their own SI or other known SI and modification bits and, together with counting circuits, determine the exact message meaning conveyed. The SIP into which the SI is inserted, in combination with the associated modification bits, determine the meaning or contents of the data. This meaning may be unique to each pair or group of member devices. All member devices of the data processing system are capable of writing identifying signals SI and modification bit signals on the data line, as well as being capable of detecting such signals and deriving the meanings. The member devices additionally are capable of clearing and SIP from the data line after receipt of the contents thereof.

Thus each member device, by recognizing its SI, may withdraw from this data line the information necessary to the performance of its particular task whether it be adding, multiplying, etc., or reception of the result. Moreover, each such member device may insert data onto the line and, in many instances, the various storage devices and input/output devices may communicate with one another independently of the central processing unit so that the central processing unit may be relieved of many of the tasks heretofore required of the conventional CPU.

The fact that each member device operates as an active intelligent device picking its particular task from the data path by way of detection of its own identification SI leads to very significant consequences in the way of simplification of equipment and versatility and flexibility of the data processing system by comparison with prior art techniques. As a result of the above, the member devices can respond to commands, receive and transmit data, and receive and transmit commands. Also the member devices are adapted to store multiple data and instructional commands in pairs or groups, and to arrange them in order.

FURTHER DETAILS OF THE SYSTEM

DUO-BINARY TO TERNARY TRANSMITTER

Figure 10:
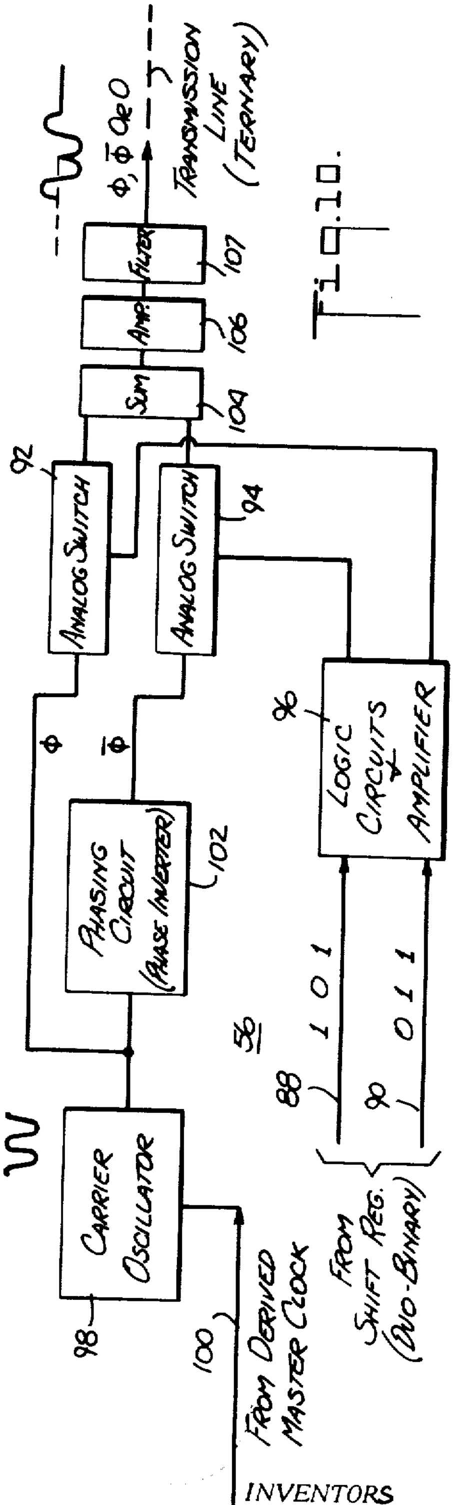
FIG. 10 is a circuit block diagram of the duo-binary to ternary transmitter of the common equipment.

Referring to FIG. 10, the transmitter 56 receives duo-binary inputs from the master shift register 54 on two lines 88 and 90, namely from registers A and B, and applies them to two analog switches 92 and 94, such as field effect transistor switches (FET), through a logic circuit and amplifier 96. When closed these analog switches 92, 94 will permit a signal to flow therethrough. More particularly, an oscillator circuit 98 provided in the transmitter 56 produces a carrier signal which is phase-locked with a derived master clock originating from the receiver 58 on line 100.

The output of the oscillator 98 is connected directly to analog switch 92 while the same output is shifted 180° in time by a phase inverter 102 whereafter the phase inverted oscillator signal is applied to the other switch 94. Logic circuit 96 is used to operate the two switches 92 and 94. Depending upon whether the duo-binary signals coming from the shift register on the two input lines 88, 90 are both "ones," a 0 and a 1, respectively, or a 1 and 0, respectively, the logic circuit 96 will transform this data to respectively open both analog switches 92 and 94, close only the switch 92, or close only the switch 94. The outputs of these two switches 92, 94 are added by a summing device 104 and then amplified in amplifier 106 and passed through a filter 107 to provide an output on line 70 which is either a DC zero level signal, a sine wave, or an inverted sine wave depending upon the duo-binary input at 88, 90 to the transmitter 56.

TERNARY TO DUO-BINARY RECEIVER

Figure 11:
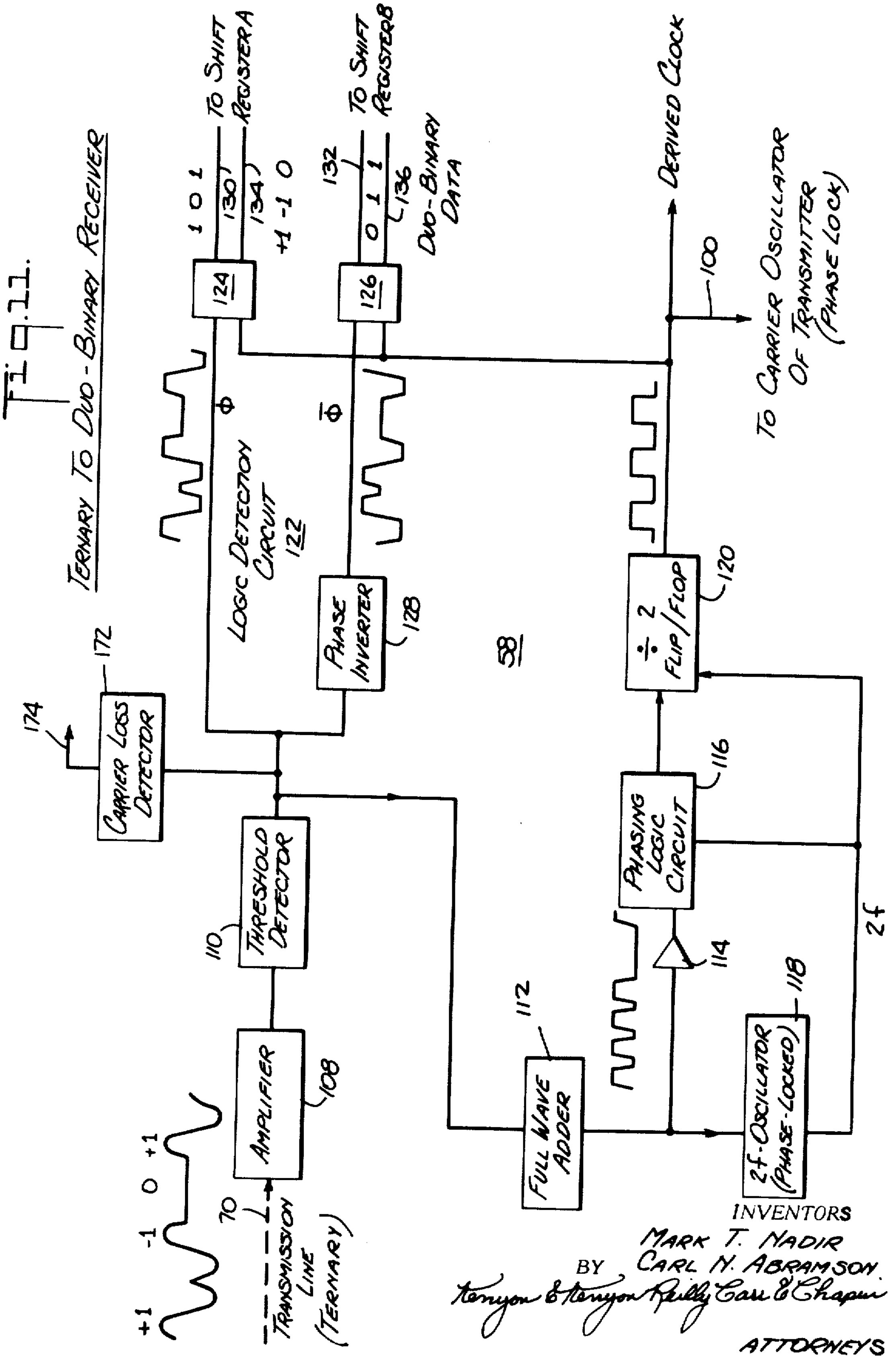
FIG. 11 is a circuit block diagram of the ternary to duo-binary receiver of the common equipment.

Referring to FIG. 11, ternary data coming in on the transmission line 70 is amplified by voltage level sensitive amplifier 108 in the receiver 58 and thereafter applied to a threshold detector 110. The squared incoming signal is effectively rectified in a full wave adder 112 and then used to produce the derived clock signal on line 100 which provides important timing as well as being used to lock the carrier oscillator 98 of the transmitter 56 to the line phase and frequency, in a manner to be hereinafter described. The line signal consists of ternary data in the form of sine waves, inverted or 180° out of phase sine waves and zero level signals. Since a zero level signal starts at the beginning and terminates at the end of a carrier cycle, such signal is conveniently used to set the phase of the oscillator 98 to the phase of the incoming line signal on line 70. The output from the full wave adder 112 is inverted by an inverter 114 and applied to a phasing logic circuit 116 with the sinusoidal signal of a 2*f*-oscillator 118 operating at twice the frequency of the incoming line signal. The phasing logic circuit 116 makes use of the fact that zero level signals are used wherein the zero level amplitude always starts at the beginning of one carrier cycle and ends with a carrier cycle, regardless of the duration of the zero amplitude signal. Consequently, the phasing logic circuit 116 provides an output signal which is in phase with the line signal. The output of the phasing circuit 116 is used to control the phase of a flip-flop 120 which is driven by the 2*f*-oscillator 118. The flip-flop output is the derived clock signal 100 having a frequency identical to the line frequency and in phase with the line signal 70. The derived clock signal 100 is applied to a logic detection circuit 122 together with both outputs of threshold detector 110 to produce a duo-binary output for the receiver. The detected incoming line signal is applied to two separate gates 124 and 126 in the logic detection circuit 122 together with the derived clock signal 100. Prior to being applied to the one gate 126, the input signal is inverted by an inverter 128. For the purpose of explaining the operation of the logic detection circuit 122, assume that if the incoming gate signal is in phase with the derived clock signal 100 then a "1" will appear at the detection gate output and, similarly, if the incoming gate signal is out-of-phase with the derived clock signal 100, then a "0" will be produced at the detection gate output. Also, if a "0" level signal appears as the incoming gate signal, then a "1" will be produced at the gate output. Since the gate 126 is receiving an inverted line signal, it follows that where a sine wave signal, which is in phase with the derived clock signal 100, appears on the incoming line then a "1" will appear at the output of logic detection gate 124 while a "0" will appear at the other gate 126 thereby producing a combined "+1" output, and depending upon the phase of the incoming gate signal the two gate outputs will provide a combined "+1" or "−1" readout. Where a zero level signal appears on the incoming line 70, then both gates 124, 126 will produce a "1" which is equivalent to a combined "0" readout. In this manner, the logic detection circuit 122 produces a duo-binary output on lines 130 and 132 which is in phase with the receiver's derived clock signal 100 and is applied to both parts of A and B of the master shift register 54. The output of gates 124 and 126 are provided on pairs of lines by flip-flops located at the output side of each gate 124 and 126. Accordingly, the complement of the signal output on line 130 will appear on line 134, and similarly, the complement of the signal output on line 132 will appear on line 136. These output lines 130, 132, 134 and 136 are connected to the corresponding four incoming data lines to the shift register 54.

MASTER SHIFT REGISTER

Figure 12:
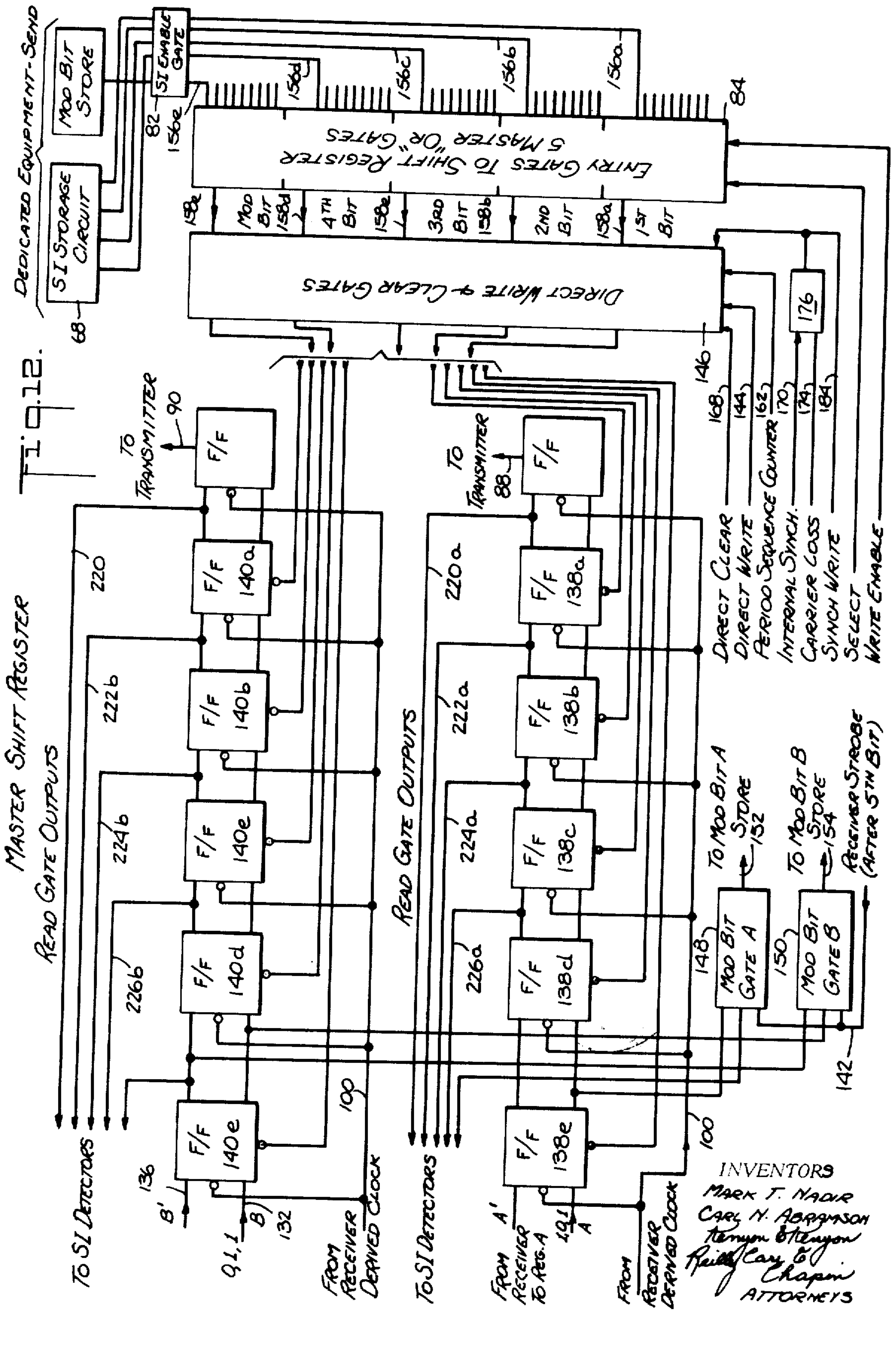
FIG. 12 shows a circuit block diagram of the master shift register of the common equipment, including the gates for writing data into such shift register.
Figure 14:
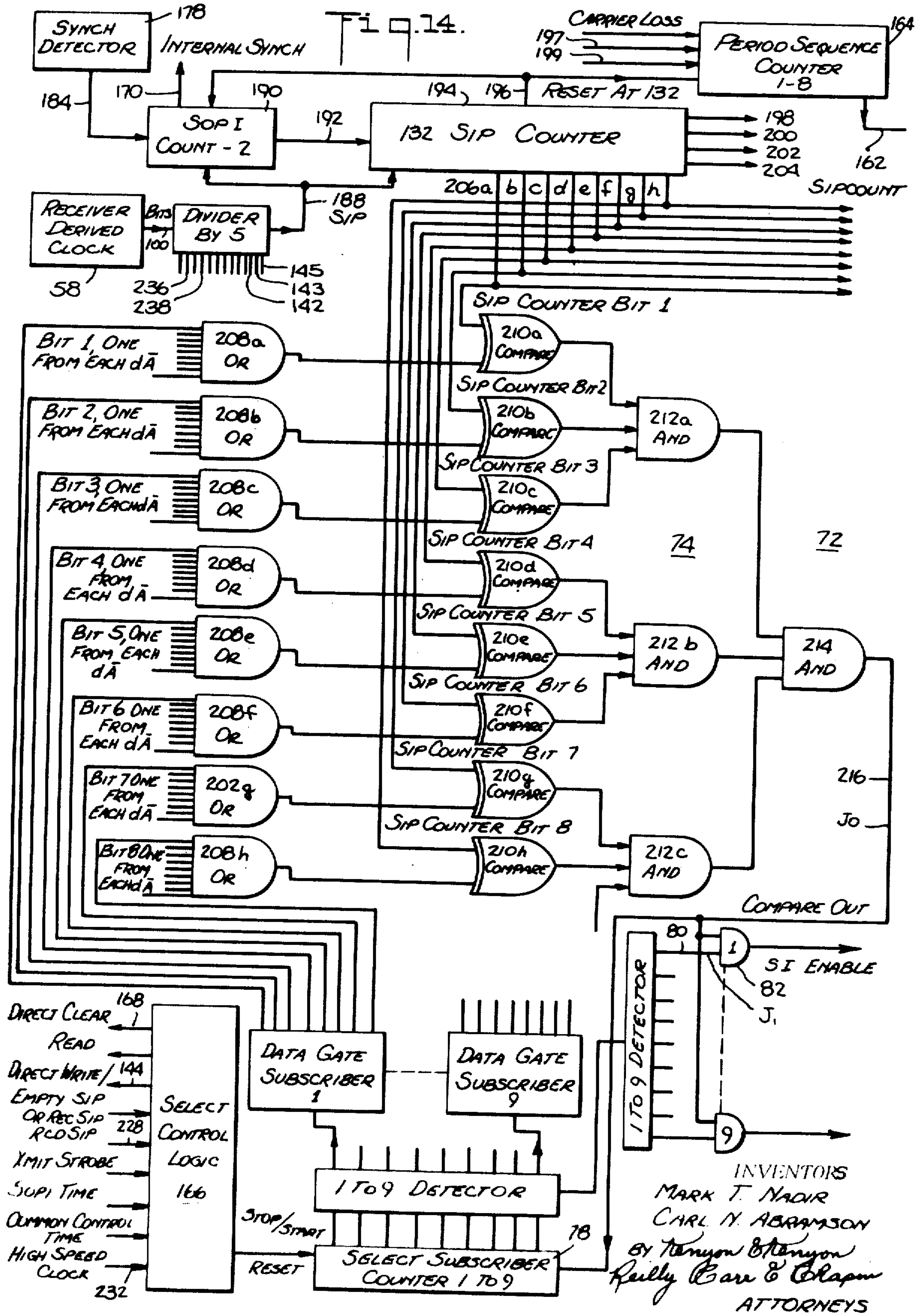
FIG. 14 shows the select mechanism of the common equipment, including the comparator, SIP counter and select subscriber counter circuits.

Referring to FIG. 12, the master shift register 54 basically comprises two sets A and B of flip-flops 138 and 140 designates as parts **138*a–e* and 140*a–e*, respectively. Duo-binary information is received serially by these flip-flops 138 and 140 on lines 130, 132, 134 and 136 from the ternary to duo-binary receiver. One-half of the duo-binary data enters register part 138 while the other half enters the register part 140 at the flip-flops 138*e* and 140*e*. As noted previously, the first four of the bits in a SIP comprise the SI while the last bit is the modification, hereinafter termed "mod" bit. Connected to each flip-flop 138, 140 is the derived clock signal 100 coming from the receiver. Derived clock signal 100 activates the flip-flops 138, 140 so as to shift or advance data information coming from the receiver 58 through the flip-flops. After five shifts occur and the mod bit occupies the last flip-flops 138*e* and 140*e* in the line, the SIP counter 76, shown in FIG. 14, provides a read count signal on line 143 to the SI detection circuit 86, shown in FIGS. 12 and 16, indicating that a complete SIP character has been received in the five flip-flops at the same time so that the SI information can now be read out. The SI detection circuit 86 observes the particular SI of the receptor, and if the SI is for one of the peripheral devices or users associated with that common equipment, such circuit 86 enables that device or user to receive the data. Bearing in mind the fact that synch or count circuits are provided throughout the system, the SIP counter 76 will provide indication of which SIP the SI was written in. After the SI is fully entered in the shift register 54 and the SI detector 86 in the common equipment has determined that the received data is for one of its peripheral devices or users, then such SI detector 86 immediately sends a SI time SIT pulse to that intended receiver to indicate that "this data is yours." This SIT pulse is received during the fifth bit count when the data is still in the master shift register 54** and the SIP count is available to the receiving unit.

It is to be noted that the derived master clock 100 provides a continuous shift in the registers 54 since it is connected to each of the register flip-flops **138*a–e* and 140*a–e*. It is also to be noted that the actual electronic circuitry in the master shift register 54** and its operation are conventional and within the state of the art and, therefore, are not described herein.

If five shifts should occur without any text information coming off of the receiver 58, then this would be detected, for example, as all "ones" in the register flip-flops **138*a–e* and 140*a–e*. If in a SIP there should be (a) a SI for one of the peripheral devices or users within a common equipment 50, or (b) no text information appearing as an all "ones" indication to the SI detector 86 that there is an empty SIP, then the system is designed so that one of the devices or users associated with that common equipment 50 will be permitted to enter new data (a SI) either on top of the old data after read out has occurred, or into the empty shift registers 54 where there was an empty SIP. Such entry of new data is accomplished by means of a direct write enable signal on line 144 to the direct write and clear gates 146 to the shift register 54. Also, the system is set up so that both reading and then writing occur during the fifth bit clock time after all the five bits have been entered into the shift register 54 from the receiver 58**. Timing for the read out and write functions is provided by strobe signals appearing at appropriate clock signals.

The procedure for entering data into the shift register 54 is designed to permit maximum use of the SIP subperiods while at the same time avoiding an overwrite or race condition. If, for example, a peripheral device or user has read out information from the shift register 54 but neither such device or user nor other devices or users operating from the same common equipment 50 has anything to send in that SIP at that time, then all "ones" will be automatically written into the register 54 to indicate that such registers are empty and available for use by devices and users in another adapter 48. More specifically, if the incoming information on the transmission line 70 was for a particular adapter 48 which had a user or peripheral device with data to be written into the register 54 in the same SIP, then the common equipment 50 of such adapter 48 would permit entry of a SI from one of the peripheral devices or users into the subperiod SIP and SIP count from counter 76 was exactly the same as that to be written. Otherwise, where a common equipment 50 has not received data for any of its users from a particular text SIP in which it requests use, then that common equipment 50 would be required to wait until the SIP to be written into is empty when it appears in the shift register 54, or until the SIP to be written into subsequently arrives in later periods with data for one of its users. In the same manner, if a peripheral device or user has read out information corresponding to a particular SIP and neither that device or user nor any of the other devices or users associated with the common equipment 50 has information to put into the SIP previously read out of, then this SIP will be empty and will become available to the other adapters 48 as it appears empty in the shift register 54 of the next common equipment physically located along the transmission line 70, and so on down the line until such SIP is used.

Data which is to be entered by the peripheral devices and users into their master shift register 54 must first pass through the write entry gates 84 and then through the direct write and clear gates 146 to the shift register 54. After writing into the shift register flip-flops **138*a–e* and 140*a–e*, this data (SI + mod bit) is shifted out of the shift register 54 to the duo-binary to ternary transmitter 56 where it is sent along the transmission line 70. When this data is received by the next common equipment 50 along the line, the SI detection circuit 86 in such common equipment observes the SI to determine which, if any, of its users in such common equipment is to receive the line information. If none of the peripheral devices or users associated with this common equipment 50 is identified by the SI in the shift register 54**, then the SI is continuously shifted out of the register and transmitted via the line to the next common equipment.

The fifth or last of the five bits in the shift register 54 is used as the mod bit. When the flip-flops **138*a–e* and 140*a–e* are strobed for reading after a complete SIP is in the shift register 54, the mod bit passes through mod bit gates 148 and 150 and on lines 152 and 154** to a mod bit store for use by the receiving device or user.

WRITE ENTRY GATES TO SHIFT REGISTER

As shown in FIG. 12, generally up to nine SI enable gates 82 are provided in each dedicated equipment 52, one gate being connected to each peripheral device and user. The inputs to these nine SI enable gates come from each of the nine remote SI storage circuits 68. The SI enable gates 82 are fed to the write entry gates 84, which are essentially five OR gates. The remote SI storage circuits 68 each provide on four lines **156*a–d* the four bits to identify the stored SI of the remote peripheral device or user. Of course, since we are working with a duo-binary system, it is to be understood that there are actually four pairs of lines coming from the remote SI storage circuits 68. All nine lines 156*a* associated with the first bits of each of the nine SIs enter a first OR-gate, all nine lines 156*b* associated with the second bits of all nine SI's enter a second OR-gate, all nine lines 156*c* associated with the third bits of the nine SI's enter a third OR-gate and all nine lines 156*d* associated with the fourth bits of the nine SI's enter a fourth OR-gate. The OR-gate operates so that the one of nine dedicated equipments 52 to receive a SI enable signal on a line 80 from the select mechanism 72 and comparator circuits 74 will be enabled to pass its SI through the SI enable gate 82 to the write entry gates 84. The output from the entry gates 84 appears on four pairs of lines 158*a–d* as the four bit SI of one of the nine users. This output enters the direct write and clear gates 146. Also, the mod bit which was held by the dedicated equipment in its mod bit store 160 will pass with the four SI bits through the SI enable gate 82 and the entry gates 84 for connection on line 158*e* to the direct write and clear gates 146**.

DIRECT WRITE AND CLEAR GATES

These gates 146, as shown in FIG. 12, receive the outputs from the write entry gates 84 and under certain conditions will enable such outputs to pass directly into the master shift register 54. In addition to receiving the outputs from the write entry gates 84, the direct write and clear gates 146 are connected to receive signals on line 162 from a period sequence counter 164, shown in FIG. 14, a direct write signal on line 144 from the select control logic circuit 166 of select mechanism 72, a direct clear signal on line 168 from the select control logic circuit 166, and other common signals for controlling traffic into the shift register. These signals are received by the direct write and clear gates 146 during the five-bit clock count.

If none of the member devices in a common equipment 50 have data to write into a particular SIP which carried data to one of the users or peripheral devices associated with such common equipment 50, then the shift register flip-flops **138*a–e* and 140*a–e* are cleared by entering all "ones" so that members in any of the other eight common equipments 50 are able to write into that SIP. This is accomplished by first detecting the absence of data for sending for a particular SIP by the select mechanism 72 which samples the users and peripheral devices and produces a direct clear signal 168 in its control logic circuit 166 when the select mechanism 72** has sampled no requests for that SIP.

The direct clear signal is then applied on line 168 to the direct clear gates 146 which write all "ones" into the shift registers 54. On the other hand, where the SI of a peripheral device or user has been passed through the write entry gates 84 for insertion into a particular SIP in the period, and direct write signal 144 has been provided by the select control logic circuit 166 to the direct write gates 146, then this SI will be entered as data into the shift register 54.

Where loss of the carrier signal from oscillator 98 occurs, then the system is immediately aware of the fact that it can no longer depend on the period sequence or synch signals, the function of which will be explained in further detail hereinafter. Therefore, the next common equipment 50 along the transmission line 70 becomes the master clock with his carrier being used by the entire system. Accordingly, the direct write gates 146 of each common equipment 50 are wired on lines 170 and 162, respectively, for writing the synch signals and the period sequence count into the master shift register 54 at the appropriate time.

Loss of the carrier can be detected by a carrier loss detector 172 in the receiver 58 which provides a signal on line 174 to the period sequence counter 164 which enables such counter 164 to generate its own period sequence for the entire system. The carrier loss detect line 174 and the internal synch signal line 170 are gated together at 176 so that where the system loses the carrier signal, the first common equipment 50 to detect this will produce a carrier loss detect signal 174 which enables the internal synch signals and period sequence counter signals on lines 170 and 162, respectively, of such common equipment 50 to be entered into the shift register 54.

One of the SOPI SIP's located at the beginning of each period has the second, third and fourth bits assigned for the synch signal while the first and fifth bits are assigned for the period sequence. The synch signal can be detected on these three level bits, respectively, as a "−1," a "0" and a "+1." The two-bit period sequence counts to eight. Accordingly, where a carrier loss is detected, the common equipment 50 to detect this condition will provide the carrier signal from its own transmitter 56 for the entire system while at the same time such common equipment will produce a synch signal on line 170 to write synch signals into the second, third and fourth bit gates and the period sequence into the first and fifth bit gates of the direct write gates 146 to the shift register 54. The synch and the period sequence will be written into the first SOPI SIP of each period. In this manner the common equipment becomes the master clock for the entire system.

Figures 13, 15:
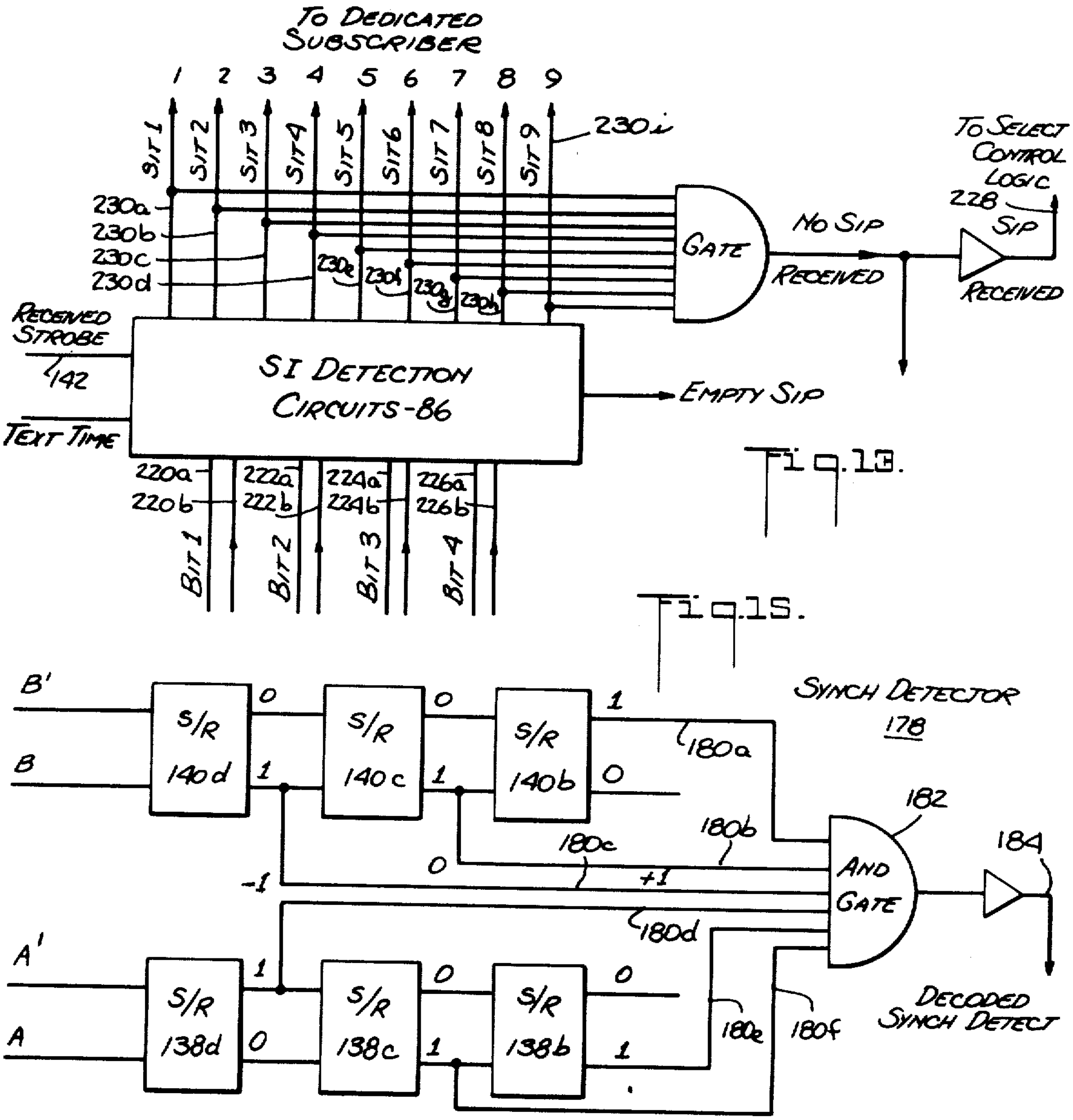
FIG. 13 shows the input and output lines associated with the SI detection circuit.
FIG. 15 shows a circuit block diagram of the synch detector.

Referring to FIG. 15, there is illustrated the manner of detecting the synch by the synch detector 178. Where the synch has been coded as a "−1," "0" and "+1" in the second, third and fourth bits, then by connecting the six lines **180*a–f* to those output sides of shift register flip-flops 138*b–d* and 140*b–d* which will provide a "1" when the synch code is entered into these flip-flops, then an AND-gate 182 and an inverter will decode the synch detect signal on line 184. Where a carrier loss is detected and consequently a synch code cannot be detected on the incoming line, the SIP counter 76, shown in FIG. 14, will be commanded to generate an internal synch signal on line 170 which is sent to the master shift register by way of the direct write gates 146. In addition to providing a synch signal on line 170 for writing into the shift register 54, the common equipment 50** also is similarly adapted to write a period sequence into the shift register. In any event, when carrier loss occurs, the system will detect this and immediately indicate that it cannot rely on the present period sequence or the line synch and thereafter will proceed to provide another carrier signal, period sequence, and internal synch for the entire data processing system.

SOPI AND SIP COUNTERS

As shown in greater detail in FIG. 14, these counters, referred to previously as SIP counters 76, consists of flip-flops and gates interconnected as a counter and driven by the derived master clock on line 100 coming from receiver 58. The SIP counter 76 includes a five-bit SIP count portion 186 adapted to produce output signals at chosen intervals in the five-bit SIP time including a SIP plus upon the passage of every five clock pulses. For instance, a 5½ bit time pulse or strobe signal appears on output line 143 coming from portion 186 when a full SI and mod bit S would occupy the shift register 54. In a system where the SIP is constituted by a four-bit SI and a one-bit mod bit, the strobe signal on 143 occurs during the read interval between 5½ and 5¾-bit time. A 5¾-bit time strobe signal is provided on line 145 and lasts for the one-quarter-bit time write interval. These strobe signals on lines 143 and 145 are used to enable the SI detection circuits 86, shown in FIG. 13, the select control logic 166, and the write entry gates 84, as well as other parts of the system. In turn, the SIP pulse is applied on line 188 to the SOPI counter 190 which is used to mark off the period of time in the period (P) which is known as the SOPI time immediately preceding the text SIP's. In this system, the SOPI, as illustrated in FIG. 1, is coded to provide an indication as to the start of each period and acts as a reference point for beginning the count of the succeeding 132 text and HAND SHAKE SIP's. After the SOPI counter 190 counts to the end of the SOPI count, it provides an enable signal on line 192 to a 132 count SIP counter 194, which signal is held for the duration of time in which the 132 SIP count occurs. After completion of the SIP count to 132, the period (P) is complete and the SOPI counter 190 again counts out the SOPI count, after which the 132 count repeats in SIP counter 194. After a SIP count of 132, a reset pulse is provided on line 196 to the 132 SIP counter 194 which again waits for the SOPI counts before beginning a new count. Thus, it is not until after the SOPI is counted that we begin counting the 132 SIP's, thereby assuring that we will be at the correct starting point when the first SIP count for the next period (P) begins. The reset signal appearing on line 196 also provides the period sequence counter 164 with a pulse after each period, in the event that the period sequence signals on lines 197, 199 to the period sequence counter 164 should fail to provide the period sequence off the incoming line information. In addition, as known previously, the synch signal and the period sequence are generated within the SOPI time.

The 132 SIP counter 194 comprises an eight-stage counter which is designed to be reset after a count of 132. This counter is advanced by one at every SIP count by the five-bit SIP counter 186 so that the SIP count comes up at the beginning of each new SIP. The first 128 SIP's are designated as text SIP's. The last four counts are designated, in order, as 129 special SIP 130 service request 131 My SI Is and 132 control SIP. Special control lines 198, 200, 202 and 204, respectively, extend out of the counter 194 for individually indicating the presence of these last four SIP counts. Accordingly, when the counter is at 129 a special SIP signal can be supplied, at the count of 131 a My SI Is signal can be supplied, and at the count of 132 a control SIP signal can be supplied. Also, it is noted that the text SIP's 1 through 128 can be employed to convey the My SI Is identification. Each of the eight stages also provides a SIP count binary output on eight lines 206*a–h* which is used throughout the system to provide SIP timing for inserting data at critical times into the master shift registers 54 and for determining the particular SIP in which incoming data was located.

One modification of the SIP counter 76 may include a divider circuit, not shown, which divides the 128 count by two, by four or otherwise so that the counter will readily be adapted for use with a 32 or 64 character input/output devices.

SELECT MECHANISM

The select mechanism 72, shown in FIG. 14, consists essentially of the comparator 74, the SIP count circuit 76, and the select subscriber counter 78 which sequentially looks at the character bits from each of its associated member devices that is in the send mode. Eight master comparator OR-gates 208*a–h* are provided for each of the eight bits defining a single character. Since 128 text SIP's are provided, then each of the 128 text characters can be correlated with each of the 128 SIP counts. The eight bits in the SIP counter are compared with the eight data bits coming out of gates 208*a–h* from each of the nine users by gates 210*a–h* to produce a single pulse output through AND-gates 212*a*, *b*, *c* and 214 to indicate when there is present a character to send in a particular SIP. The comparator 74 generates a signal on line 216 which stops the select subscriber counter 78 thereby indicating which of the member devices has this matched character. The select counter 78 is driven via line 232 by a high speed clock 218, shown in FIG. 16, thereby enabling the select counter 78 to scan the line member devices at a very fast rate. When stopped, the select counter 78 signals the SI enable gate 82 in the selected member device via one of lines 80.

It is pointed out that there are two conditions which must be met before information is sent in a SIP. The first of these conditions is that there exists a character for the SIP to send. The second of these conditions is that the shift register SIP is empty or potentially empty. A shift register SIP is potentially empty when it is being received by the local common equipment destined for one of its member devices. Where a SIP is received by a common equipment 50 for one of its users or peripheral devices and there is no data to be entered in the SIP at that time by any of such users or peripheral devices, then the select control logic circuit 166, having received the received SIP signal on line 228 coming from the SI detection circuit, shown in FIG. 13, will provide the direct clear signal on line 168. This signal on line 168 is applied to the direct clear gates 146 to clear the shift register 54 and thereby permit entry by another common equipment 50 into the particular SIP.

Thus, the comparator 74 determines the first condition which is that there is a SIP to send for that particular SIP count. The SI detection circuit 86 determines the second condition that the SIP is empty or potentially empty. After the above two conditions are met a signal is sent to the selected user or peripheral device to indicate that it can now send. At the same time, this particular user or peripheral device must be in the send mode of operation and must be signalling that it desires to transmit this particular information.

SI DECODER

The SI detection circuitry 86. Shown in FIG. 13, examines the SI in the shift register 54 to initially determine whether the incoming information should be directed to one of the peripheral devices or users associated with that particular adapter 48 and, secondly, to determine which of these users or devices should receive such information. To accomplish these functions, the decoder 86 detects the first two bits of the SI on lines 220*a*, *b* and 222*a*, *b* to determine the local adapter 48, and the third and fourth bits of the SI on lines 224*a*, *b* and 226*a*, *b* to determine the particular peripheral device or user to which the information is directed. The first two sets of bits may be thought of as zoning bits. Since we are working with a duo-binary system, then apparently up to nine adapters 48 as well as the identification of up to nine peripheral devices and users associated with each of such adapters 48 can be determined by detecting these four bits. The detection circuitry 86 will generate a SIP received signal on line 228 when its local identification number appears in these first two bits and another signal identifying the particular member device will be produced which, together with the SIP received signal 228, will produce a SIT signal on one of the nine SIT lines 230*a–i* extending from the output of the SI detection circuit 86 to the nine member devices. The SIT pulse will be sent to only the one user or peripheral device identified by the SI to indicate that "the SI in the SIP is yours." Then, the SIT signal will operate to enable the member device to utilize the incoming data in the shift register 54. The SIP received signal on line 228 also is fed to the select control logic circuit 166. While all nine member devices within a local adapter 48 have the identical local bits designated, the last two bits are not shared among the nine member devices (peripheral or users) but rather are assigned individually to each so that only the particular peripheral device or user which is identified by both the local and the particular zoning bits will receive the information on the data line.

CLOCK GENERATOR

Figure 16:
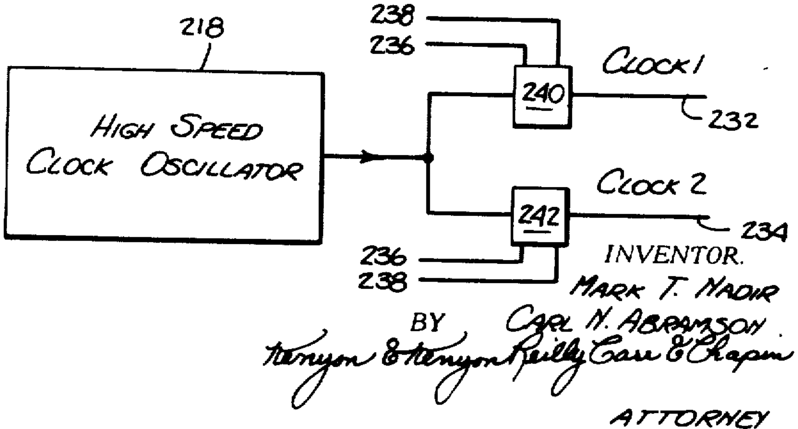
FIG. 16 shows the input and output lines associated with the high speed clock oscillator.

Referring to FIG. 16, the clock generator 218 consists of a free running high speed oscillator which provides two high frequency clock outputs on lines 232 and 234, respectively, having the same frequency but displaced in time from each other by means of gates 240 and 242. The clock outputs on lines 232 and 234 are periodically turned on and off by two timing signals on lines 236, 238 coming from the five-bit SIP counter 186, which signals turn the clock output signals on and off at the appropriate times. One function of the clock 218 is to shift data into and out of the storage buffers 62 of the dedicated equipment 52. Another function of the clock 218 is to drive the select subscriber counter 78 so that it scans the data presented for sending by the nine dedicated subscribers at a very high rate. It is to be pointed out that these storage buffers 62 are not to be confused with the master shift register 54 of the common equipment 50.

The storage buffers 62 of the dedicated equipment 52 comprise a five-character buffer unit into which data is entered into the first row after the data in the first row has been shifted to the second row, and so on down to the last row where the data there was emptied out of the buffer 62. Each alternate row of flip-flops has one of the two high speed clock signals on lines 232, 234 applied for purposes of shifting data out of the buffer rows while the intermediate row has the other of the two high speed clock signals applied to shift data into the emptied out rows. When a peripheral device or user is in the send mode of operation, data will be removed from the last buffer row of its associated dedicated equipment 52 during the send fifth bit time upon being selected by the common equipment 50 to enter its SI into the particular SIP representing the data character. Bearing in mind the fact that data can be removed from the last buffer row only during the send fifth bit time when a complete five-bit SIP appears in the master shift register 54, one can understand that it is important that no new data be shifted into the last buffer row at this time, since such new data would be entered on top of the last character in such row thereby destroying the previous character before it was transmitted in a SIP. Accordingly, the high speed clock outputs on lines 232 and 234 can be turned on at times other than the fifth bit time, such as during the first bit time only, by applying the timing signals on lines 236 and 238, from the five-bit SIP counter 186, to the output gates 240 and 242. Thus, during the fifth bit time no data would be shifted by the clock 218 into the last four rows. However, data may be entered into the first row, if it is empty, as will be more fully explained hereinafter.

BUFFER STORE

Figure 17:
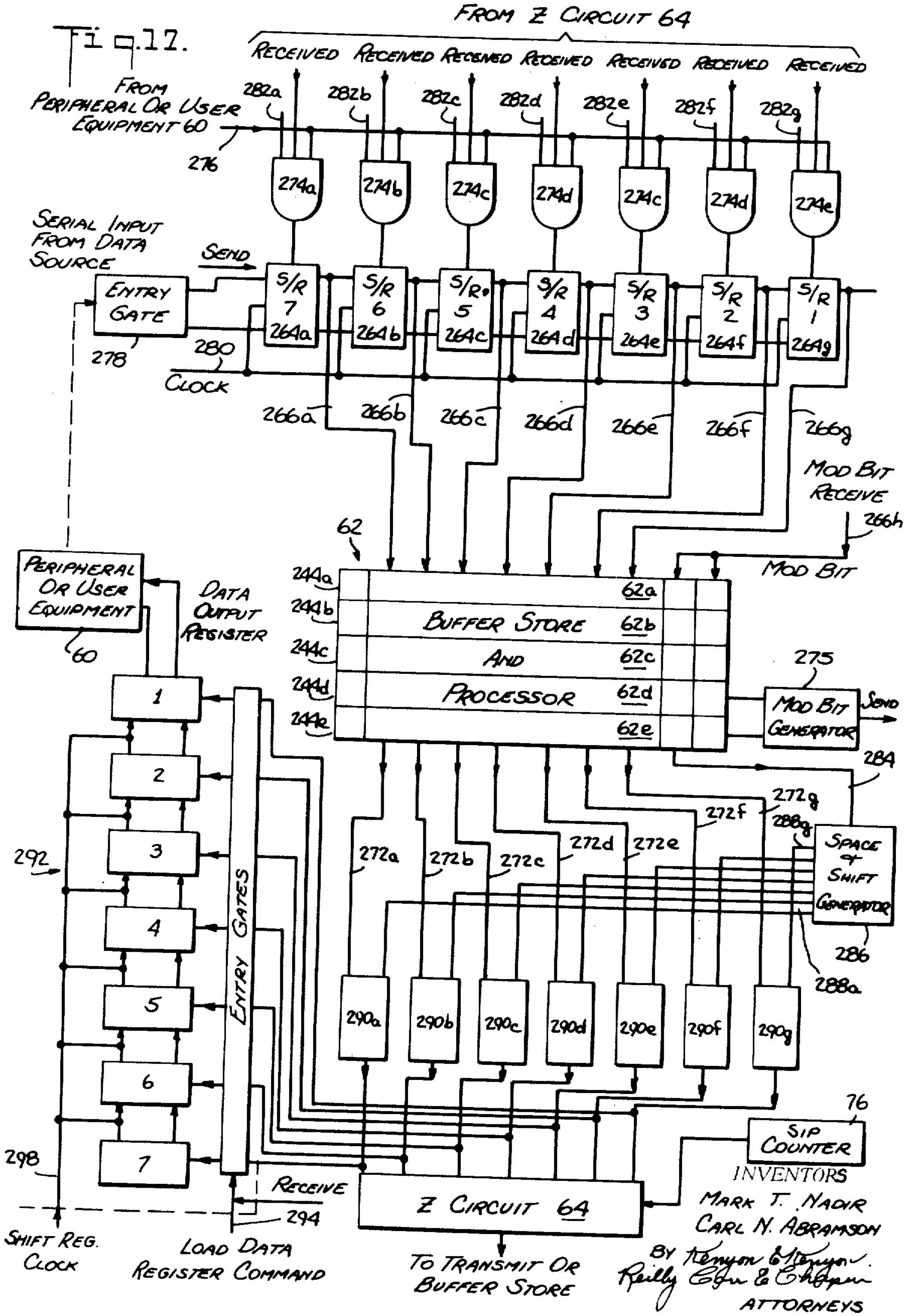
FIG. 17 shows a circuit block diagram of the buffer store and the send and received registers connecting such buffer store with the peripheral devices and users.
Figure 18:
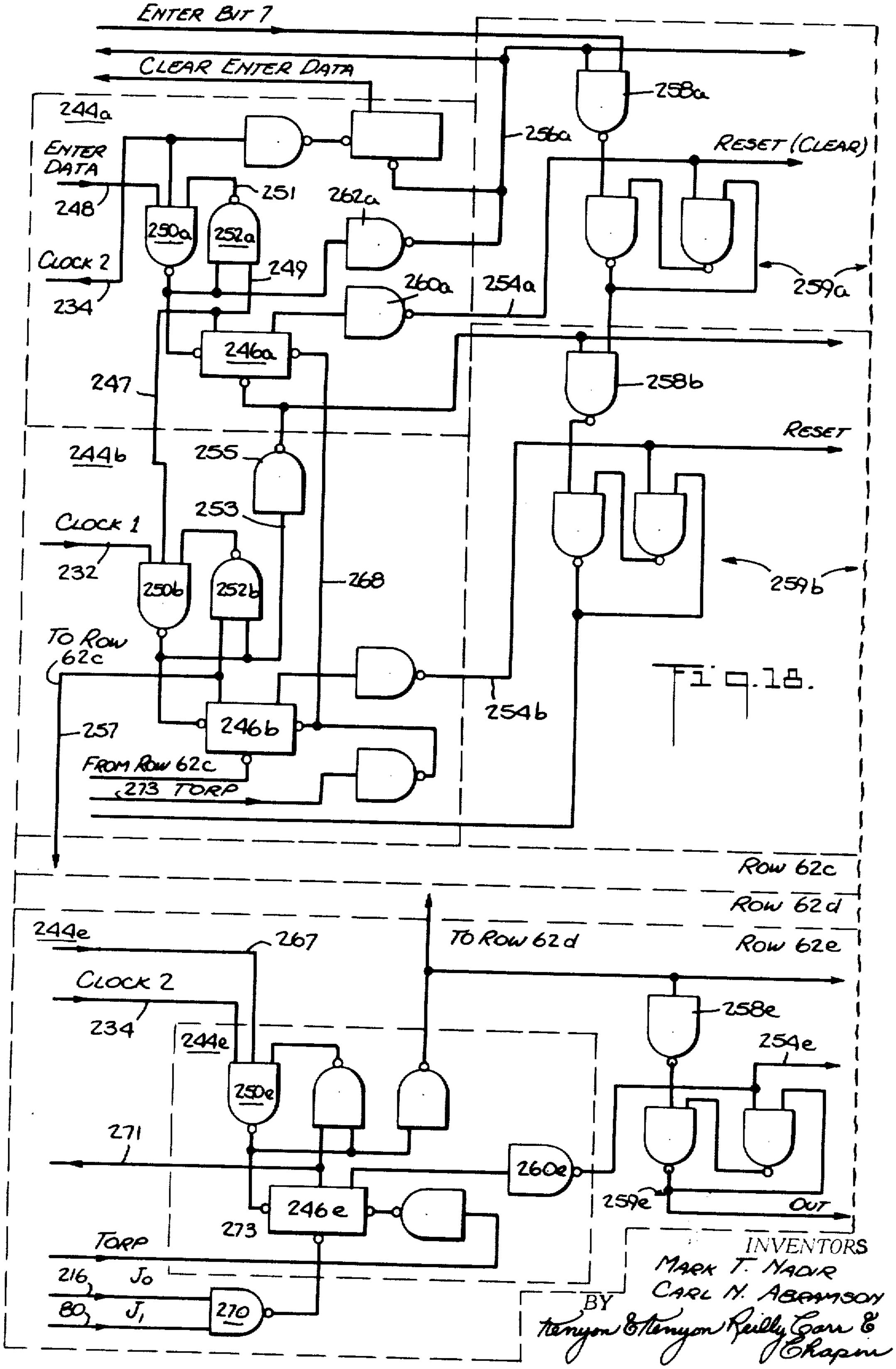
FIG. 18 shows a circuit block diagram of the logic control entry gates and flip-flops for the buffer store.

Referring to FIGS. 17 and 18, a five character buffer store is provided having accommodation for a seven-bit character plus one duo-binary mod bit. When a member device is in the send mode of operation, a logic control entry gate and flip-flop **244*a–e* are enabled for each character or row 62*a–e*, respectively, of the buffer 62 to permit or deny entry of data into each associated row depending on whether the row is empty or full. FIG. 18 shows the logic control entry gates and flip-flops 244*a*, *b* and *e* of the buffer rows 62*a*, *b* and *e* in logic block form to illustrate the operation of the buffer 62**.

When the equipment is turned on, a turn on reset pulse TORP is produced on line 273 to set the gates and flip-flops to their initial condition. More specifically, logic control entry flip-flops **246*a*, *b* and *e*, respectively, are associated with a respective buffer row 62*a*, *b* and *e*, as shown in FIG. 18. Entry flip-flops, not shown, are also provided for the buffer rows 62*c* and *d*. These flip-flops 246*a*, *b* and *e* will be in a "1" condition when its associated buffer row 62*a*, *b* and *e*, respectively, is loaded with data and in a "0" condition when such buffer row is empty. When one of the flip-flops, such as 246*a*, is set in the "1" or loaded condition, then data will not be permitted to enter the buffer row 62*a*. Accordingly, when the equipment is turned on, the TORP signal on line 273 will directly reset each of the entry flip-flops 246*a*, *b*, *e*, to the "0" condition. Subsequently, an enter data command signal on line 248 to the first buffer row 62*a* starts the train of data coming into the buffer 62. The enter data command signal on line 248, together with the simultaneous occurrence of the high speed clock output pulse on line 234, will set the entry flip-flop 246*a* to the "1" condition via an entry gate 250*a*. Upon the setting of flip-flop 246*a*, a gate 252*a* is caused to claim the entry gate 250*a* closed via the lines 249 and 251. With the gate 250*a* held closed, any further enter data commands on line 248 will not affect the flip-flop 246*a* while it is in the set condition. Thus, the setting of the flip-flop 246*a* holds the gates 252*a* and 250*a* in the closed or "off" condition in a manner which permits data to be entered into the buffer row 62*a* only once when the flip-flop 246*a* is set. Thereafter, an enter data command on line 248 will not affect the flip-flop 246*a* until it is reset to the "0" condition. Also, the setting of flip-flop 246*a* to the "1" condition removes the reset signal provided by the flip-flop 246*a* via gate 260*a* and line 254*a* to the storage flip-flops 259*a* of row 62*a*. In addition, when the flip-flop 246*a* is set to the "1" condition, eight acceptor gates 258 will be enabled via drive gate 262*a* and line 256*a* thereby permitting a nine-bit (seven data plus two mod bit) binary character to be entered in the buffer flip-flops 259*a* through such accepter gates 258*a* from the buffer input register 264 on lines 266*a–g*. A duo-binary mod bit is received in the buffer 62 on line 266*h***.

As noted in the discussion of the high speed clock 218, the clock 1 and clock 2 outputs on lines 232 and 234, respectively, consist of signal pulses occurring at the same frequency, but out of phase relation with each other. The setting of the flip-flop **246*a*, the removal of the buffer reset signal on line 254*a* and the enabling of acceptor gates 258, all occur during the clock 2 pulse time on line 234. The clock 1 and clock 2 signals alternately operate on alternate rows of the buffer 62** to shift data into and out of each row.

The setting of flip-flop **246*a* provides an enable signal on line 247 to the entry gate 250*b* to the flip-flop 246*b* in the adjacent lower row. This enable signal on line 247 operates on the buffer row 62*b* in essentially the same manner as the enter data command signal on line 248 to buffer row 62*a*. Accordingly, when the clock 1 pulse arrives on line 232 to the entry gate 250*b*, then the buffer row 62*b* undergoes the same procedure as discussed in reference to the upper row 62*a*, whereby the gate 250*b* is opened and the flip-flop 246*a* is set to the "1" condition to remove the reset signal on line 254*b* and enable the accepter gates 258*b* to permit entry of data from buffer row 62*a* into buffer flip-flops 259*b*. Thus, data is shifted into the buffer flip-flops 259*b* during the clock 1 pulse time. When the clock 1 pulse time ends, then the entry flip-flop 246*a* reset via a line 253 and gate 255 to such flip-flop 246*a*. At this time, the reset line 254 is on and the data has been cleared out of buffer row 62*a* and the entry flip-flop 246*a* has been forced to the "0" condition. It is to be pointed out that if the lower logic control flip-flop 246*b* was initially in a "1" or loaded condition, then such flip-flop 246*b*** could not have reset the upper flip-flop 246*a* to a "0" condition. In such case, data from the upper row 62*a* would not have been able to clear out of the upper row 62*a* and into the already loaded lower row.

Similarly, the next buffer row 62*c* receives an enable signal on line 257 from the upper adjacent flip-flop 246*b* and the process is repeated between rows 62*b* and *c*, and so on to row *d*. In this fashion, the use of the logic control entry gates and flip-flops 244*a–e* act as a steering mechanism to prevent a race condition whereby data is entered or written on top of existing data. In summary, where a lower row is empty then the high speed clock pulses on lines 232, 234 will shift data from the row immediately above it down into the lower row. The state of the logic control entry flip-flop in the lower row determines if data from the adjacent upper row will be shifted below to permit new data to be entered into the upper row. The logic control entry flip-flop 246*e* in the very last or fifth row 62*e* is similarly set to the "1" condition by the clock 2 signal and the enable signal on line 267 from the adjacent upper row 62*d*.

However, the entry flip-flop 246*e* is not reset to the "0" condition by a signal from a lower adjacent row, but rather is reset by two signals *Jo* and *Ji* on lines 216 and 80. Signals *Jo* and *Ji* are produced when the data stored in the last buffer row 62*e* has been selected by the selected circuit 72 and sent out, and therefore can be discarded. More specifically, the signal *Jo* on line 216 is provided by the comparator 74, shown in FIG. 14, indicating that a valid comparison has been made by the select mechanism 72 between one of the dedicated equipments 52 for a peripheral device or user device and the SIP count of the SIP counter 76. The signal *Ji* on line 80 is provided by the select subscriber counter 78 which indicates that it is that particular peripheral device or user device which has been matched. With these two signals on lines 80 and 216 from the select mechanism 72 present, a gate 270 will be activated which in turn sets the flip-flop 246 *e* to the "0" condition whereby all of the lower buffers 62*e* are cleared via a gate 260*e* and reset line 254*e*. These buffers 62*e* are connected to the Z-circuit 64 which, when the peripheral device or user is in the send mode of operation, operates with a Z-number on the character coming out of the buffer 62, in a manner more fully explained hereinafter. When the peripheral device or user device is in the receive mode of operation, the last row 62*e* of the buffer is connected to deliver data to such receiving device.

Once again, it is to be pointed out that only during the first bit time is data for sending shifted into the last four rows 62*b*, *c*, *d* and *e* of the storage buffer. And data, if any, can be entered only into the first row 62*a* when the logic control entry flip-flop 246*a* is in the "0" or empty condition. This is accomplished simply by turning on the high speed clock signals to these rows only during the first bit time so as to prevent the occurrence of any data shift. Consequently, no new data will be permitted to enter on top of the character in the last row 62*e*. Thus, when a comparison has been detected between the particular dedicated equipment of a member device and the SIP count, then the SI of this member device is entered during the first bit time, and the signals on lines 80 and 216 indicating such comparison will be fed back to the flip-flop 246*e* in the last row to set it to the "0" condition.

The condition of the flip-flop 246*e* is continuously represented on the output line 271 which connects with the select mechanism 72 so that when the particular member device is in the send mode and the signal on line 271 indicates that the flip-flop 246*e* is in the "0" or empty condition, then the select mechanism 72 need not look at the dedicated equipment 52 of such member device with its comparator 74. Also, the turn-on reset pulse TORP is also provided on line 273 to clear the buffers 62*e* and set them back to their original condition upon turn-on of equipment or termination of a message.

DATA INPUT REGISTER TO BUFFER STORE

The data input register 264 shown in FIG. 17 comprises essentially 7 buffer flip-flops 264*a–g* connected to receive incoming line information during the receive mode and also to receive data from the terminal equipment 60 such as an input/output device or other member device, for transmission during the send mode of operation.

When a member device is in the transmit mode of operation, all of data character bits are entered simultaneously and in parallel into the buffer 62. The select mechanism 72 of the common equipment 50 instructs the gates of the member devices to present their data onto the common lines one peripheral device or user at a time, at which time the comparator 74 compares this data with the SIP count. When in the send mode, the character stored in the last row 62*e* of the buffer is transformed by the Z-circuit 64 before being presented onto the common lines for comparison.

When a member device is in the receive mode of operation, the data on the incoming line is de-Zed by the Z-circuit 64 before it is entered through the lines 266*a–g* into the buffer. Subsequently, the data in the buffer 62 can be processed from the binary form back into the symbol form in the member's equipment.

Entry and receive gates 274*a–g*, respectively, are connected to each register flip-flop 264*a–g*, respectively, so as to receive the seven data bits simultaneously and in parallel during the receive mode of operation. When in the receive mode, the data entering these gates 274*a–g* will have been De-Zed prior to passing through such gates into the data input register 264. Also, the gates 274*a–g* are enabled by a signal on line 276 from the member's equipment when such equipment is set to receive incoming data. When a member device is in the send mode of operation, data may enter the input register 264 in serial form through an entry gate 278, as shown. Where a member device uses parallel entry, the input register 264 can be adapted to accept data in this form. Additional flip-flops not shown, are provided in front of the first bit flip-flop 264*g* and in back of the last bit flip-flop 264*a* to serve as a start bit and a stop indicator whereby a designated combination of these bits such as all "0's" are used to detect a full input register condition before data is entered from the data input register 264 into the buffer store 62. Serial data entering the input register 264 through entry gate 278 is shifted in by a clock signal on line 280 connected to each flip-flop 264*a–g*. When the input register 264 is loaded, the information stored therein can be detected on lines 266*a–g* for various purposes. For instance, during HANDSHAKING all "ones" can be detected in the flip-flops 264*a–g* as an all "ones" check on the receipt by the receptor of the correct Z-number through the binary addition of the Z-number sent by the originator and its complement sent back from the receptor's equipment, which sum is equivalent to all "ones" in binary form.

The outputs of the input register 264 are connected to the five-character buffer store 62. However, before data is entered into the buffers, several conditions must exist, which together will provide the enter data enabling signal on line 248 to the buffer entry gate 250*a*, shown in FIG. 18. One condition is that the buffer control entry logic flip-flop 246*a* is in the "0" condition indicating that the first buffer row 62*a* is empty. Another condition is that the data input register 264 is full. Another condition is that the high speed clock signal on line 232 from the clock 218 is present since data is entered into the buffer 62 only during this clock time. During the send mode, different conditions must be fulfilled before entry of data into the buffers, these being the presence of both a signal indicating that the particular member device is busy and a send enable signal indicating that the register 264 is full and ready for sending.

In addition to sending data through the entry gate 278 into the input register 264 to the buffer 62, data in the form of the M, P, and F numbers of a member can be sent on lines 282*a–g* respectively, through the entry gates 274*a–g*, respectively, to the input register 264.

BUFFER STORE SIGNAL PROCESSOR

These circuits, not shown, generally provide the logic timing and command signals for the buffer 62 and include circuits for those functions described previously. Some of these functions are inhibit signal where the control entry flip-flop 246*e* of the buffer row 62*e* is filled with data, a request for HAND SHAKE SIP, north and south-going command signals for steering information in the north or south directions in the system, a load shift register 54 signal, downshift and space gates for detecting the characters and sending their associated mod bits in the SI, mod bit send gates for setting the data mod bits into position in the buffer for sending the same, special control character decode signals for detecting control mod bits during the HAND SHAKE made of operation, and HAND SHAKE time and My *Si* Is enabling signals for the buffer 62.

Referring more particularly to FIG. 17, the output lines 272*a–g* of buffer row 62*e* are connected to selected circuitry for detecting special characters. Special characters are assigned for subsequent transformation into the mod bit used with a SI, such as a downshift or space for a teletype machine. At the sender's end, the space or downshift command enters the buffer 62 as a seven-bit character and is detected and converted by means of a mod bit generator 275 into a space or downshift signal which eventually is sent out as a mod bit in the SI. In the same manner, at the receiver's end, these mod bits in the incoming SI are presented to the buffer 62 on line 266*h* and shifted until it passes out on line 284 to a space and shift generator 286 which decodes the duo-binary mod bit and transforms it into a seven-bit character which is fed via lines 288*a–g* directly through the buffer output gates 290*a–g* and entry gates 296 to a data output register 292. In this fashion, the use of a mod bit provides substantial data or character compression since a separate character would otherwise have had to be transmitted to send space or downshift information. In this regard it is to be pointed out that this mod bit data can be sent as a separate character in cases where where is no character available into which the mod bit can be entered.

When in the receive mode of operation, the de-Zed data that is shifted out of the last buffer row 62*e* passes via lines 272*a–g* through the buffer output gates 290*a–g* and entry gates 296 to the data output register 292. When in the send mode of operation, the data passes through a different circuit path, as shown by FIGS. 7 and 17. Generally, a peripheral device or user's data source feeds the data to the data input register 264, the output of which is connected to the buffer store 62. Data from the buffer store 62 is operated on by the Z-circuit 64 and then compared by the select mechanism 72. When this data is selected, a SI is entered into the SIP corresponding to the matched character and placed on the transmission line 70 by the transmitter 56.

DATA OUTPUT REGISTER

The data output register 292 is essentially a shift register which operates during the receive mode of operation to transfer incoming data from the buffer store 62 to the external terminal equipment 60. When output register 292 is empty, then a command signal appears on line 294 from the equipment 60 to open then entry gates 296 to the output register 292. Data from the buffer store 62 is emptied into the output register in parallel form and thereafter is shifted and removed serially to the peripheral device or user's machine 60 by means of a clock signal on line 298. In the data equipment 60, this serial data is transformed back into its original symbol form.

Z-CIRCUITS

As previously described, the basic purpose for the Z-circuit 64 is to randomize the assigned text SIP's associated with the various characters, for each dedicated equipment 52, so that members having identical original characters to transmit at the same time will have possibly all 128 text SIP's in which to transmit such character, as contrasted with having only one SIP available to all members for a particular character.

Figure 20:
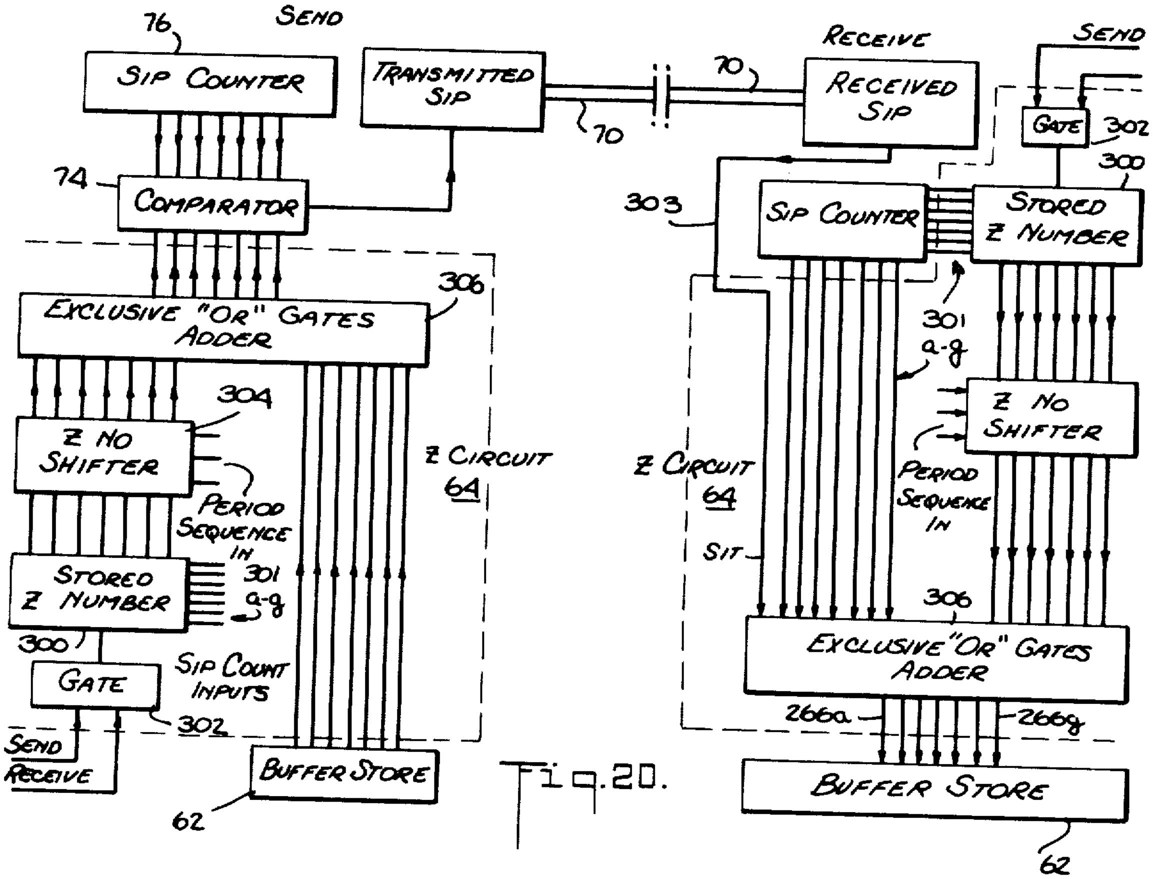
FIG. 20 shows a circuit block diagram of the Z-circuit as it is connected in the dedicated equipment during the send and the receive modes of operation.
Figure 19:
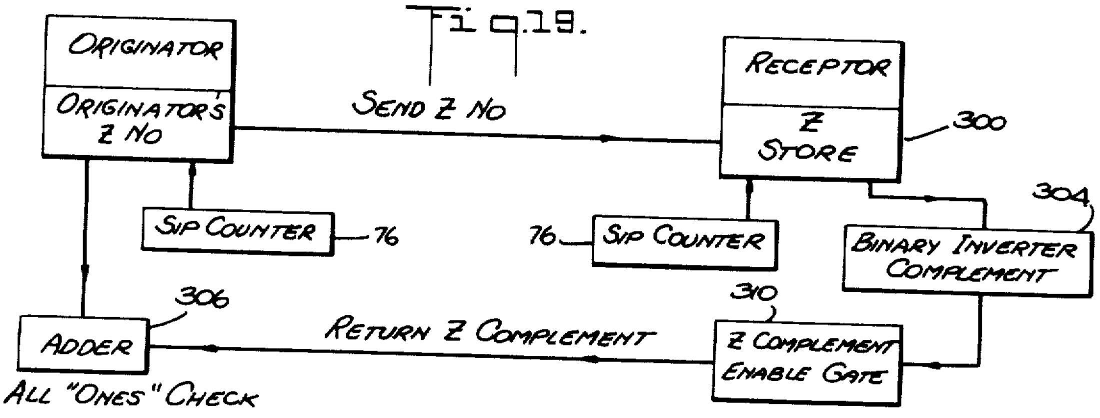
FIG. 19 shows a block diagram of the validation circuitry used for checking on the receipt of the correct Z-number.
Figure 21:
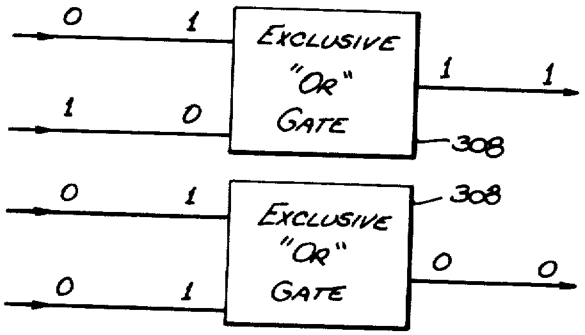
FIG. 21 shows a logic diagram illustrating the logic operation of the exclusive OR-gates, employed in portions of the equipment.

Referring to FIGS. 19–21, the Z-number of an originator is sent to a receptor during the HAND SHAKE procedure between such two member devices. It is to be pointed out that while two such members are in the HAND SHAKE mode of operation, any of the other members in the system can be simultaneously engaged in either the text mode of operation or the HAND SHAKE mode and communicating text information within the same period (P) as the two members engaged in the HAND SHAKE mode of operation. Thus, the 128 text SIP's will have one meaning, in the HAND SHAKING sense, as between the two HAND SHAKING members while at the same time these SIP's will be accompanied by a different meaning in the text sense, for the remaining members. For instance, during the HAND SHAKE procedure the receptor at some designated time will learn the Z-number of the originator by sending the receptor's SI to the receptor in a particular SIP in the period (P). At the receptor's end, this Z number is simply the SIP count on lines 301*a–g* to the circuit 64 at the time the SIT pulse appears on lines 303. Thus, the SI arrives in the SIP which represents the Z-number. For instance, during HAND SHAKING, if you have a Z-number equal to nine, it can be transmitted by sending out the receptor's SI in the ninth SIP, and upon receipt the Z-number will be entered into Z-number store 300 as a numeral 9.

A further refinement in the application of the Z-number is the use of the period sequence counter 164 which is designed to simultaneously change the Z-number used by two members at every period and for a total of eight periods after which the Z-number sequence repeats itself. For instance, the seven binary bits representing the Z-number can be laterally shifted once each period. Other patterns of Z-number variation may also be employed. In this case, during the first four counts of an eight-period sequence count, the Z-number is systematically changed. During the last four periods, however, the complement of the original Z-number taken in binary form can be altered in the same fashion and sequence as the original Z-number in the first four counts. Accordingly, during the first and fifth periods of the period sequence counter 164, the Z-number complement and the Z-number, respectively, are used.

Connected to the Z-circuit 64 are seven lines **301*a–g* of the eight-bit SIP counter 76, As shown in FIGS. 19 and 20. The SIP count lines 301*a–g* are also connected to the seven-stage Z-number store 300. An enable gate 302 enables the entry and storage of a Z-number during either the send or receive mode of operation. During the HAND SHAKE procedure, the receptor receives the Z-number as a SIP count and simply stores it in the Z-store 300. The receptor also produces the complement of this Z-number in a Z-number shifter 304 and returns the Z-complement to the originator. Subsequently, the originator adds the Z-number with the returned Z-complement by means of an adder circuit 306 which should produce a total of all "ones" as a check on the receipt by the receptor of the correct Z-number. During the text time between the two members, this stored Z-number in Z-store 300 will operate on any incoming data being received by a receiving member device by adding the Z-number to the SIP count in which the incoming SI appeared to obtain the original character transmitted by the sending member device. The period sequence counter 164 further operates on the stored Z-number by means of the Z-number shifter 304. When the SIP counter 76 indicates which particular SIP was received during text time, the adder circuit 306 will add the SIP count of the incoming information to the period sequence Z-number to obtain the original SIP count or character on lines 266*a–g* going to the buffer store 62**.

In the Z-circuit 64, the input binary character is added to a second binary number, in this case a Z-number, by a process which throws away any carry bits to obtain a new number (Z-ed number). This addition can be accomplished by an exclusive OR-gate 308, shown in FIG. 21, wherein a "0" plus a "1" provide a "1" output, and a "0" plus a "0" or a "1" plus a "1" provide a "0" output. If this sum (Z-ed number) is again added to the same Z-number, then the resulting sum will be identical to the original number, (De-Zed). For instance, where a number, such as the number five and represented in binary form as 101 is added to a Z-number equal to three, represented in binary form as 011, then the resultant binary number will equal 110, having dropped any carry bits. This Z-ed number might have the sixth SIP assigned to it when it is sent by a member device. At the receiving members, when the Z-ed number 110 has the same Z-number 011 added to it, the resultant character (De-Zed number) will equal a binary number of 101 which is identical to the original binary number or character of five. This is the manner in which the exclusive OR-gates 306 of the Z-circuit 64 are employed to provide a Z-ed character for transmission on the data line to a receiving member and then to transform or De-Z this character back to the original character for use by the receiving member.

In summary, a character is transmitted by a data processing station by entering data from a peripheral device or user 60 into the buffer store 62. The output of the buffer store 62 is connected to the Z-circuit 64 where the SIP count associated with the word leaving the buffer will have added to it the Z-number by means of the exclusive OR-gates 306 of the Z-circuit 64. The resulting Z-ed character will be compared with the SIP count from SIP counter 76 of the select mechanism 72. When a match occurs, the SI of the receiving member will be entered into the master shift register 54 in a SIP corresponding to the matched character, after which it is sent through the duo-binary to ternary transmitter 56 to the dedicated equipment 52 of the receiving member. When this incoming data is received, it is still the Z-ed character and therefore must be De-Zed before it can be meaningful to the peripheral device or user 60 at the receiving end. Consequently, the Z-ed character, represented by the SIP count, is again added to the Z-number stored in the Z-circuit 64 of the receiving member. To obtain the original character, the resultant original character leaving the Z-circuit 64 is applied to the buffer store 62 where it is processed and eventually sent to the peripheral device or user 60. It is noted that data is transferred between the CPU and the peripheral devices and user devices in a manner similar to that described above.

During the HAND SHAKE mode of operation, the pure Z-number will be transmitted by the originator as a part of a fixed sequence. This is done simply by providing the last buffer row **62*e* empty so that the buffer 62** will provide no SIP count and thus no data to be added to the Z-number.

As noted previously, when a Z-number has been received during the HAND SHAKE mode of operation, eight different Z-numbers will be sequentially derived and applied during the eight periods counted by the period sequence counter 164. Since the Z-number is used to get a more uniform distribution of data, such uniform distribution is further assured by varying the apparent Z-number during each of these eight periods, thus making the chance of the various peripheral devices and users having the same Z-number at a particular time become further remote. It is to be pointed out that the HAND SHAKE procedure is set up so that the Z-number is transmitted at a designated time in this procedure. Transmission of Z-number is accomplished by first setting the condition of the flip-flop **246*e* in the last buffer row 62*e* to a "1" to enable sending. At this time, the empty last row 62*e* is sent out together with the Z-number of the originator, which results in the pure Z-number being transmitted. In other words, curing the Z-number transmission time of the HAND SHAKE procedure the pure Z-number is sent out without any other data added thereto Also, during the HAND SHAKE procedure when the receptor receives the originator's Z-number it is entered into the Z-store 300 and the period sequence counter 164 will be sent into its first period. As illustrated by FIG. 19, the complement of the received Z-number is sent back to the originator who then adds it in his Z-circuit 64. The sum of the originator's Z-number and the Z-complement should equal all "ones." This checking procedure enables a peripheral device or user device or CPU to send a Z-number without having to consider what the specific Z-number was since his checking circuit will produce an all "ones" output indicating the correct Z-number was transmitted and received at the other end. During transmission of the Z-complement a Z-complement enable gate 310 was held open, and upon release of this hold signal, the entire Z-circuit 64 operates off the period sequence counter 164 in a similar manner to transmit four different Z-numbers plus their complements totalling eight different Z-numbers by sequentially providing signals to a plurality of enabling gates in the Z-number shifter 304** for making different Z-numbers.

HAND SHAKE PROCEDURE

The HAND SHAKE procedure is a mode of operation in which the involved peripheral devices, users and CPU are not transmitting textual data to one another but rather are establishing communication preparatory to the actual data transmission. After the HAND SHAKE procedure is completed, the two HAND SHAKING members automatically transfer from this operation to the text mode of operation.

Any of a large variety of HAND SHAKE procedures can be employed. One procedure could be unique for some users while such procedure could be designed with different steps and other sequences for other users, and consequently, different HAND SHAKE procedures can be used between different users.

Figures 22A, 22B:
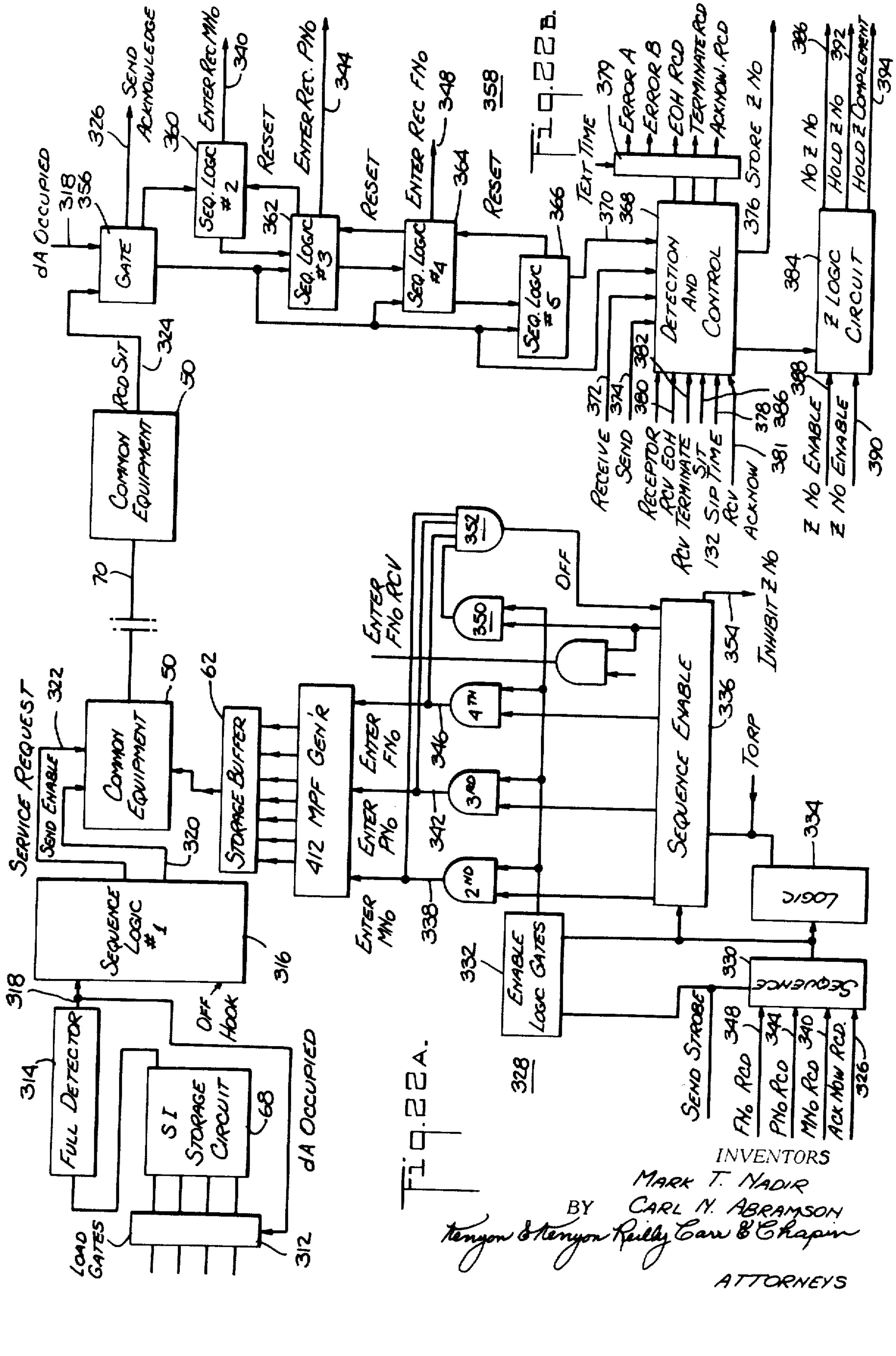
FIGS. 22A and 22B, respectively, show the sequence logic diagrams for the HAND SHAKE circuits of the originator and the receptor, respectively.

In one HAND SHAKE procedure, shown in FIGS. 22A and B, there are three conditions which must exist before the HAND SHAKE message can be initiated. The first requirement is that the originator's data equipment 60 is off-hook, the second that the originator's SI storage circuit 68 is loaded with the receptor's SI, accomplished by opening the load gates 312 to such storage circuit 68 and clocking in the four SI bits, and the third that the originator's equipment 52 has detected the loaded SI storage circuit 68 by detector 314 indicating that it has the complete address before proceeding further. These three conditions constitute the first logic sequence 316 in the HAND SHAKE procedure after which the originator's equipment is placed in the busy mode. Upon the detection of a loaded SI condition, a dedicated equipment occupied signal, referred to as "*d*A occupied," on line 318 assures that no other member can start a HAND SHAKE sequence with the originator. At this time, a send enable signal is sent on line 320 to the common equipment 50 instructing that you wish to send data, together with a service request signal on line 322 which in effect is a request that the originator's SI be entered in SIP 130. In this HAND SHAKE procedure, the sequence employed is one in which the 130th SIP in the period is assigned to the request service wherein the originator sends out the receptor's SI which is readily detected by such receptor at the other end. The 131st SIP is assigned to the "My SI Is" operation wherein the originator sends his own SI to the receptor for storage in the receptor's SI storage circuit 68, and the 132nd SIP is assigned as to the control SIP for sending acknowledge, terminate, end of heading and error A and B signals. Receipt by the receptor of the SI sent by the originator in the 130th SIP automatically informs the receptor that he must immediately observe the 131st SIP so as to read and store the originator's SI, entered therein. During the 130th SIP, the receptor receives a SIT signal on line 324 from the common equipment 50 which opens his SI store 68 so that the information contained within the 131st SIP is automatically stored. During the service request, the originator's circuitry automatically provides an enable signal to the originator's SI enable gate 82, shown in FIG. 7, to permit the originator's SI to be entered by the common equipment 50 into the 131st SIP.

The dedicated equipment 52 of each member is set up so that the SI stored in the storage circuit 68 is always the SI of another data processing station (CPU, peripheral device or user) with whom you are communicating. Accordingly, the SI detector 86 in a common equipment 50 is designed to detect only those SI signals identifying its own associated data processing stations. However, each dedicated equipment is connected to a SI wired into its circuitry, shown as originator SI generator 66 in FIG. 7, and adapted to be enabled and sent out with the "My SI Is" SIP upon occurrence of a service request. Obviously, it is important that a receptor know the SI of the originator for purposes of addressing and communicating data back to the originator. For this reason, the receptor stores the originator's SI. During the 131st SIP, the entry gates to the receptor's SI storage circuit 68 are opened so that the incoming bits from the master shift register 54 enter such storage circuit 68. When the four bits have been entered in the SI storage circuit 68, a full SI condition is detected and a signal produced to provide on line 318 a *d*A occupied signal so entry into the receptor's SI storage circuit 68 by other members is denied. When the receptor has stored the originator's SI, the "*d*A occupied" signal generated on line 318 by the receptor causes an acknowledge signal on line 326 to be sent back to the originator.

The acknowledge signal on line 326 is used to start a Z M P F sequencer 328 in the originator's equipment. Initiation of the sequencer control logic in circuits 330, 332, 334 and 336 starts the second logic sequence of the HAND SHAKE procedure wherein an enter M number command signal is generated on line 338 to an MPF generator 412. MPF generator 412 is connected to the command output lines 338, 342 and 346 of the ZMPF sequencer 328 and respectively provides an M, P, or F number which appears on the seven output lines of the generator 412 leading to buffer store 62.

At this time, the originator sends his M number by placing his SI into the one of the 128 text SIP's which corresponds with his M number, such as in the 19th SIP corresponding an M number 19. Upon receipt of this M number, the receptor sends back the received M number to the originator, together with a mod bit compatibility signal which indicates whether the receptor's machine can talk, listen or both talk and listen to the originator's machine. When the originator receives the returned M number a signal on line 340 operates the next sequence by setting the originator's ZMPF sequencer 328 into the third sequence wherein an enter P number command signal is generated on line 342 to the MPF generator 412.

In a similar fashion, the receptor sends back to the originator the received P number and its associated mod bit compatibility signal from which a received P number signal on line 344 sets the originator's ZMPF sequencer 328 to the fourth sequence. During the fourth sequence, a command signal on line 346 to the MPF generator 412 will operate to send the originator's F number to the receptor. After the received F number acknowledgment signal on line 348 from the receptor appears at the originator's equipment, such signal will act to turn off the Z M P F sequencer 328 through gates 350 and 352 while at the same time releasing an inhibit Z-number signal on line 354, which was constantly on while the Z M P F sequencer 328 was operating. Upon release of this inhibit signal, the Z-storage buffer 300 is now permitted to enter the Z-number for transmission.

It is to be pointed out once again that this sequence is designed so that the M, P, F, and Z numbers will be sent to the receptor in a predetermined order so that the receptor's equipment can automatically attach a meaning to these numbers upon receipt thereof.

THE RECEPTOR'S HAND SHAKE SEQUENCER

Referring more particularly to FIG. 22B, after the "*d*A occupied" signal on line 218 is produced, the receptor automatically is on notice that the next SIT pulse received by the receptor from the common equipment 50 will be the M number. The simultaneous occurrence of both the "*d*A occupied signal" and this SIT pulse on lines 318 and 324, respectively, will open a sequencer entry gate 256 to the receptor's HAND SHAKE logic sequencer 358. After the sequence entry gate 356 is opened, a sequence for both receptor and the originator is initiated and a sequence 2 logic gate 360 is opened to command the receptor to receive and enter the incoming M number. Opening of the sequence 2 logic gate 360 also produces an enable signal to permit opening of a sequence 3 logic gate 362 when the next SIT pulse appears on line 324 at the sequencer entry gate 356. This next SIT pulse will thus cause the gate 362 to provide a command to the receptor to receive and enter the P number coming from the originator. When sequence 3 logic gate 362 is opened, a reset signal is produced to close the sequence 2 logic gate 360 thereby preventing the next SIT pulse from entering the incoming data as an M number. Similarly, the sequence 3 logic gate 362 will provide an enable signal to a sequence 4 logic gate 364 which also resets the sequence 3 logic gate 362 and command the receptor to receive and enter the F number coming from the originator. In actuality, the command signals produced by the sequence logic gates 360, 362 and 364 instruct the receptor that the SIP or SIP count in which this SI is presently coming in on and for which a SIT pulse was provided is the M, or P, or F number, respectively, of the originator.

After the sequence 4 logic gate 364 is opened, an enable signal is sent out to a sequence 5 logic gate 366 which subsequently provides a reset signal to gate 364. The next SIT pulse will then operate the sequence 5 logic gate 366 and produce an enable signal for the detection and control circuitry 368 of the receptor's HAND SHAKE sequencer 358. The sequence detection and control circuit 368 receives both the sequence 5 logic enable signal on line 370 plus either a receive or send command signal on lines 372 and 374, respectively, depending on the mode that the receptor is operating in and provides a command signal on line 376 to the Z-circuit 64 to store the Z-number sent out by the originator. The sequence detection and control circuit 368 also receives a 132 SIP time signal on line 378 derived from the SIP counter 76. Upon the simultaneous occurrence of this 132 SIP time signal and the SIT pulse on line 324 during the HAND SHAKE procedure, then the receptor will receive a mod bit indicating either an "acknowledge," an "end of HAND SHAKE" or a "terminate" signal on lines 381, 380 or 382, respectively. Where an "end of HAND SHAKE" signal is received from the originator's equipment the receptor will be placed into the text mode and a text time signal will enter a Z-logic circuit 384 connected to the sequence detection and control circuit 368.

During text time the outputs from the detection and control 368 can be used by the receptor to check for errors in the transmission of the SI by means of an error circuit 379. For instance, if any of the SI bits should be altered, as by noise on the lines, the SI will be misdirected to a dedicated equipment 52 other than the intended receptor thereby resulting in incorrect data transmission. One manner of checking for such errors is to have the receiving member count the number of SIT pulses received on line 386 and send back an indication of the total number of characters received during a communication so that the sending member can check this number with his own tabulation. This Z-logic circuit 384 provides a signal on line 386 which indicates the failure of the Z-number to arrive, and signals on lines 388, 390, 392 and 394 for holding or releasing the Z-number and its complement from storage.

Figures 23, 24:
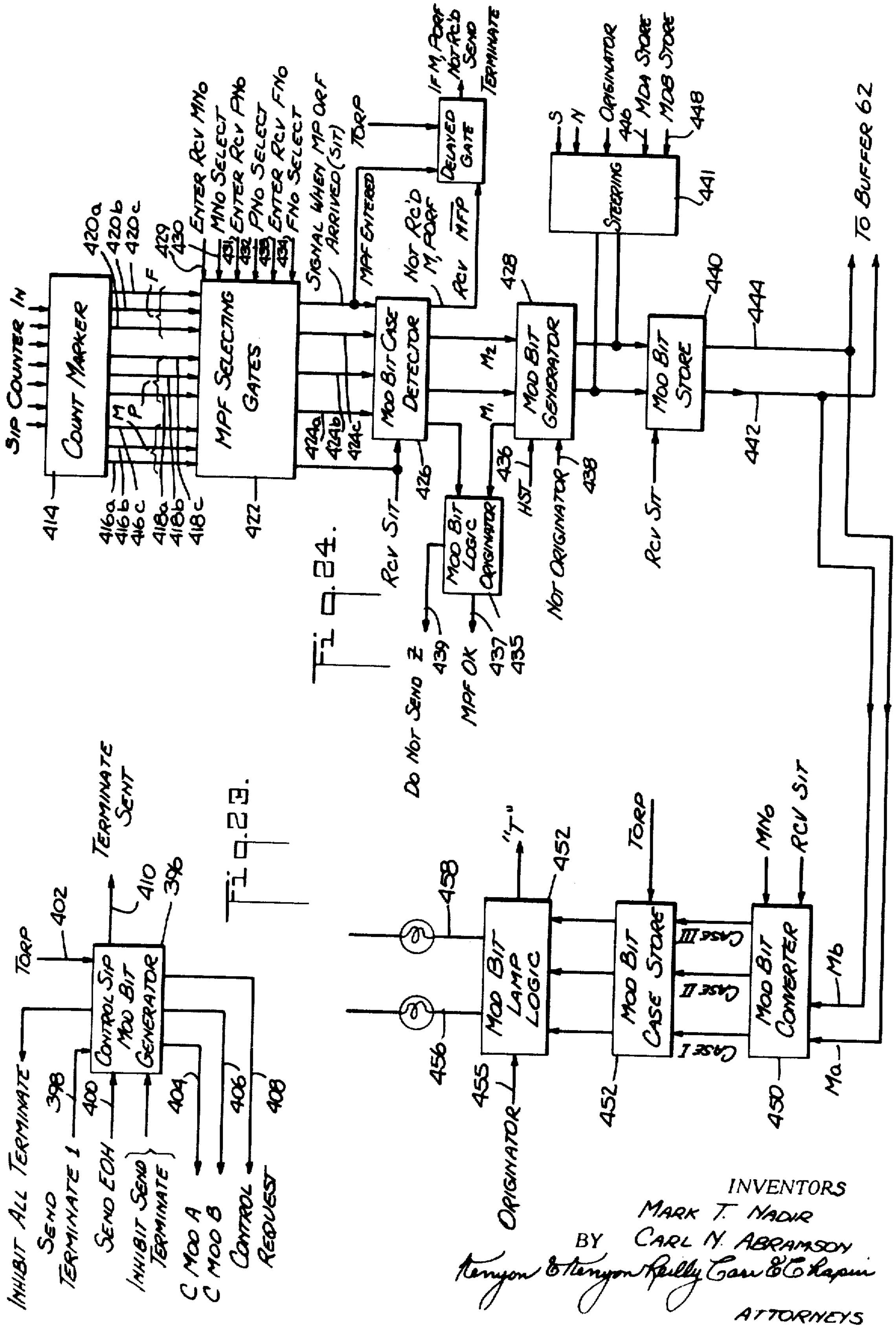
FIG. 23 shows the input and output lines associated with the modification bit generator for the control SIP.
FIG. 24 shows a block diagram of the MPF validation circuitry used during the HAND SHAKE procedure.

Referring to FIG. 23, the 132nd SIP is assigned as the control SIP and as such is used during the HAND SHAKE time to send "acknowledge," "terminate" or "end of HAND SHAKE" signals. These three signals are generated in the mod bit of the 132nd SIP. A control SIP mod bit generator 396 is provided in the receptor's HAND SHAKE logic circuit for receiving the "-send terminate," "send end of HAND SHAKE" (EOH) and the reset of "TORP" signal on lines 398, 400 and 402, respectively. The TORP signal is generated whenever a terminate has been sent and provides a reset signal which clears all the registers of the member's dedicated equipment 52 to set them back into their original condition, such as the receptor's sequence logic gates 358, which were individually locked after the particular sequence occurred. Also, during turn-on time of a dedicated equipment 52, a reset signal in the form of a TORP is sent. Thus the TORP signal is sent whenever turn-on of equipment occurs and when a total message has been completed. Upon receipt of the above signals, the control SIP mod bit generator 396 provides the two duo-binary lines 404 and 406 on which the mod bit is sent, as well as a control request signal on line 408 requesting that the data be placed in the 132nd SIP. Generator 396 also provides a command signal on line 410 to the sequence logic circuits of the dedicated equipment 52 to indicate that the receptor has sent a terminate. Where the receptor has either sent or received a terminate signal, then a TORP signal will be generated.

M P F VALIDATION CIRCUITRY

Whenever an M, P, or F number is sent by the originator, the receptor returns the M, P or F number, respectively, so that the originator can confirm the receipt of the correct number. Assuming that the originator has an M number of eight and sends this in the eighth SIP ordinarily, the receptor would receive a SIT pulse during the eighth SIP count.

Referring to FIG. 24, the receptor is provided with a count marker 414 which is preprogrammed with the receptor's compatibility with various M, P and F numbers of other subscribers. More specifically, the count market 414 receives the SIP count from the SIP counter corresponding with the M, P or F number of the originator and applies this number or count to a pre-programmed matrix of M, P or F numbers with which the receptor is compatible, in varying degrees.

Since the data processing equipment of a receptor, such as a peripheral device, user or CPU, may be designed with a format that can talk only to certain type machines, listen only to others, and both talk and listen to still other machines, then it is important that the two HAND SHAKING members be informed of the nature of their compatibility. Accordingly, this matrix is programmed with fixed positions or counts corresponding to several M numbers, P numbers and F numbers. Each of these fixed positions is respectively connected to one of the M lines 416*a*, *b* and *c*, the P lines 418*a*, *b* and *c*, or the F lines 420*a*, *b* and *c* coming out of the count market 414. An M, P or F number is received by the count marker 414 in the fixed count coinciding with such number and automatically placed on one of the output lines, according to the pre-programmed compatibility. For example, assume that an M number equal to eight is sent by the originator and received in the receptor's count market 414. This M number appears as a pulse in the eighth count in the matrix of the count market 414. Depending on whether the receptor's machine can talk only, listen only, or both talk and listen, respectively, to a machine having an M number of eight, this pulse in the eighth count will appear on one of the lines 416*a*, 416*b* or 416*c*, respectively.

The output lines of count market 414 are connected to MPF selecting gates 422 which also receives and M, P or F number select signal on lines 430, 432, 434, respectively. Selecting gates 422 also receive signals arriving on lines 429, 431 and 433 during the SIP times in which the M, P and F numbers, respectively, are received. In turn, the selecting gates 422 provide an output signal on line 424*a*, *b*, or *c* for either the M, P or F numbers indicating whether the talk, listen or talk and listen condition exists. These three-gate output lines are connected to a mod bit case detector 426 which in turn provides signals to a mod bit generator. During the HAND SHAKE procedure, the receptor's mod bit generator 428 will be enabled by a HAND SHAKE time (HST) signal on line 436 and by a "not originator" member signal on line 438 to produce the mod bit for the M, P and F numbers, which mod bits are stored in a mod bit store 440. The mod bit store 440 holds such mod bits until it receives a SIT pulse, at which time it sends the mod bit on lines 442 and 444 to the data storage buffer 62 for transmission together with the M, P or F number back to the originator.

As noted previously, the originator receives the M, P or F number that he previously sent to the receptor, together with a duo-binary mod bit produced by the receptor in mod bit generator 428. Obviously, since the receptor previously provided the mod bit on lines 446, 448 entering the originator's steering circuit 441, then the originator need not use the generator 412. The originator's mod bit generator 428 is not enabled on line 438 so that the mod bit received on lines 446, 448 passes undisturbed to the mod bit store 440. In fact, inasmuch as the HAND SHAKE procedure is designed in a manner whereby the originator receives his own M, P or F number off the incoming line, the originator's count market 441 and selecting gates 422 would necessarily produce a talk and listen output signal on lines 416*c* and 424*c*.

Other circuits employed in the MPF validation circuits include a mod bit logic circuit 435 which provides an "MPF O.K." signal on line 437 when the correct M, P and F numbers are returned. Also, where an M, P or F number has not been received by a subscriber, then a "SEND TERMINATE" command is provided in the MPF validation circuits.

At the originator's end, the duo-binary mod bit signals received with the M, P and F numbers are applied via lines 442, 444 to a mod bit converter 450 to detect the one of three conditions which applies between the receptor and his own equipment. The converter 540 outputs are held in a mod bit case store 452 for detection by a lamp logic circuit 454 which is used to illuminate the originator's mod bit lamps 456 and 458 to indicate the talk, listen, or talk and listen conditions. The lamp logic of the originator's circuit 454 is invented by a signal on line 455 in a manner which illuminates those lamps applicable to the originator's condition with respect to the receptor. For example, if the receptor's lamps 456, 458 should indicate a "can talk" to originator condition, then the originator's lamps will indicate a "can listen" to receptor condition.

At the receptor's end, the mod bits associated with the M, P and F numbers and produced by means of count market 414, selecting gates 422, case detector 426 and generator 428 are provided on lines 442 and 444 for both the purpose of sending on the transmission line to the originator and for illuminating the receptor's lamps 456 and 458.

Although the above description is directed to preferred embodiments of the invention, it is noted that other variations and modifications of the data processing system will be apparent to those skilled in the art and, therefore, may be made without departing from the spirit and scope of the present disclosure.

We claim:

1. A system for processing data comprising:

a central processing station (CPU) for processing data;

at least one peripheral station for storing or otherwise containing data;

at least one user station;

a transmission line interconnecting the stations for intercommunications;

means at each of said stations for recognizing on the transmission line each of a multiplicity of discrete subperiods within a period (P), the subperiods having assigned data meanings;

data correlating means at the stations for associating each of a plurality of data meanings to be transferred with respective ones of said discrete subperiods;

means at said stations for determining whether subperiods on said transmission line are available for use;

storage means at said stations for holding the data meanings to be transmitted until subperiods corresponding to said held data meanings are available; and signal sending means, responsive to the data correlating means and the storage means, for inserting station identifying signals on the transmission line into the available discrete subperiods having assigned data meanings correlated with said held data meanings;

whereby any of the stations may, in response to the station identifying signals on the transmission line, derive the transferred data meanings corresponding to the discrete subperiods having said station identifying signals.

2. A system as in claim 1 including:

means at the stations for detecting station identifying signals on said transmission line; and further data correlating means responsive to the detecting means for associating each of the subperiods in which the station identifying signals occur with the assigned data meanings.

3. A system as in claim 1 including:

means connected to said data correlating means for altering the association of the data meanings with the subperiods to randomize the data meaning assignment.

4. A system as in claim 1 including:

means, connected to said signal sending means, for shifting the insertion of the station identifying signals from subperiods of proper data meanings to subperiods of different data meanings; and means at the stations for receiving said station identifying signals and for restoring the proper data meanings.

5. A system as in claim 1 in which said signal sending means includes means for storing signals identifying a data receiving station.

6. A system as in claim 1 in which said signal sending means includes means for storing signals identifying a data sending station.

7. A system as in claim 2 in which said signal sending means includes means for storing signals identifying a data receiving station.

8. A system as in claim 2 in which said signal sending means includes means for storing signals identifying a data sending station.

9. A system for processing data comprising:

a central processing station (CPU) for processing data, said central processing station connected to a transmission line;

at least one peripheral station connected to said transmission line for storing or otherwise containing data;

at least one user station connected to said transmission line;

a counter for the stations for producing count numbers indicative of the occurrence of each of a multiplicity of discrete subperiods within a period (P), the counting being repeated for each period (P), the discrete subperiods of each period (P) having assigned data meanings;

message correlating means at one or more stations for associating each of a plurality of data meanings to be transferred with respective ones of said discrete subperiods, and establishing a data representative number indicative of each correlation;

storage means for storing the established data representative numbers;

comparator means for comparing the subperiod count numbers with the stored data representative numbers; and signal sending means, responsive to said comparator means, for inserting station identifying signals into the selected discrete subperiods correlated with said data meanings to be transferred;

whereby any of the stations may, in response to the station identifying signals, derive the data meanings corresponding to the subperiods having said station identifying signals.

10. A system as in claim 9 including:

means at said stations for detecting the station identifying signals; and further data correlating means responsive to the detecting means for associating each of the subperiods in which the station identifying signals occur with the assigned data meanings.

11. A system as in claim 9 including:

means, connected to said data correlating means, for altering the correlation of the data meanings with the subperiods to randomize the data meaning assignment.

12. A system as in claim 9 including:

means, connected to said signal sending means, for shifting the insertion of the identifying signals from subperiods of proper data meanings to subperiods of different data meanings; and means at the stations for receiving said station identifying signals and for restoring the proper data meanings.

13. A system as in claim 9 in which said signal sending means includes means for storing signals identifying a data receiving station.

14. A system as in claim 9 in which said signal sending means includes means for storing signals identifying a data sending station.

15. A system as in claim 10 in which said signal sending means includes means for storing signals identifying a data receiving station.

16. A system as in claim 10 in which said signal sending means includes means for storing signals identifying a data sending station.

17. System as recited in claim 1, further comprising an interface unit connecting said central processing station with the transmission line, said interface unit including;

means for detecting said station identifying signals on the transmission line;

counter means for determining the subperiod in which station identifying signals are detected by said detecting means, said counter means producing subperiod numbers representative of discrete subperiods in which said station identifying signals are detected; and means for indicating to said central processing station each station identified by said station identifying signals detected on said transmission line together with the subperiod numbers representative of said detected station identifying signals;

whereby said central processing station can derive the data meaning corresponding to the particular subperiods having said station identifying signals, as well as identifying the stations sending and/or receiving said signals.

18. System as recited in claim 17 wherein said indicating means of said interface unit comprises a plurality of individual station lines connected to said central processing station, with each of said station lines being associated with an individual one of said user stations and said peripheral stations, and said means for detecting said station identifying signals is connected to each of said station lines for sending subperiod numbers on those lines associated with the stations identified by said station identifying signals received in respective subperiods, whereby a station identifying signal identifying a given peripheral or user station and received in a particular subperiod will cause a subperiod number representative of said received subperiod to be sent on that line associated with the identified station.

19. System as recited in claim 18, wherein said interface unit includes means for receiving subperiod number and station identifying information from said central processing station over said station lines, and means for conveying said information over said transmission line in the form of station identifying signals inserted in the subperiods represented by said received subperiod numbers.

20. System as recited in claim 17, wherein said indicating means comprises line means connected between said interface unit and said central processing station for sending both the station identifying signals and the subperiod numbers in which said station identifying signals are detected by said interface unit.

21. System as recited in claim 20, wherein said line means for connecting interface unit with said central processing station comprises a first line for transmitting said subperiod numbers and a second line for transmitting said station identifying signals.

22. System as recited in claim 1, also comprising:

an interface unit connecting said transmission line to said central processing station, said interfacing unit comprising a modem for modulating and demodulating the signals sent out on or received from the transmission line, said modem providing signals representative of the station identifying signals received from the transmission line for transmittal to said central processing station; and at said central processing station, means for detecting said station identifying signals, and counting means for determining the subperiod numbers associated with the subperiods in which the station identifying signals are received;

whereby the data meanings are determined in said central processing station by the particular subperiod position in which the station identifying signals are received.

23. A system for processing data, comprising:

a central processing station for processing data, said central processing station being connected to a transmission line;

a plurality of user stations connected to said transmission line;

means, at said user stations, for recognizing on said transmission line each of a multiplicity of discrete subperiods within a period (P), said subperiods having assigned data meanings;

data correlating means at said user stations for associating each of a plurality of data meanings to be transferred with respective ones of said discrete subperiods;

means at said user stations for determining whether subperiods on the transmission line are available for use;

storage means at said user stations for holding the message meanings to be transmitted until subperiods corresponding to said held data meanings are available;

signal sending means, at said user stations, responsive to said data correlating means and said storage means, for inserting station identifying signals into available selected subperiods having assigned data meanings correlated with said held data meanings; and an interface unit connected between said central processing station and said transmission line, said interface unit including means for detecting said station identifying signals in said discrete subperiods on the transmission line, means for indicating to said central processing station both the stations identified by said station identifying signals and the discrete subperiods in which said station identifying signals are detected, and means for sending from said central processing station onto said transmission line, station identifying signals inserted into the discrete subperiods having assigned data meanings correlated with the data meanings to be sent by said central processing station.

* * * * *